US009773242B1

(12) United States Patent
Boates et al.

(10) Patent No.: US 9,773,242 B1
(45) Date of Patent: Sep. 26, 2017

(54) MOBILE POINT-OF-SALE CROWDFUNDING

(71) Applicant: Square, Inc., San Franscisco, CA (US)

(72) Inventors: Brian Boates, San Franscisco, CA (US); Adam Jeremy Fern, San Francisco, CA (US); John Bryan Scott, San Francisco, CA (US); Andrew Kimball, Moraga, CA (US); Donald Clark, San Franscisco, CA (US)

(73) Assignee: SQUARE, INC., San Francisco, CA (US)

( * ) Notice: Subject to any disclaimer, the term of this patent is extended or adjusted under 35 U.S.C. 154(b) by 0 days.

(21) Appl. No.: 14/663,209

(22) Filed: Mar. 19, 2015

(51) Int. Cl.
| | |
|---|---|
| *G06G 1/12* | (2006.01) |
| *G06Q 20/00* | (2012.01) |
| *G07B 17/00* | (2006.01) |
| *G07F 19/00* | (2006.01) |
| *G06Q 20/34* | (2012.01) |
| *G06Q 20/20* | (2012.01) |

(52) U.S. Cl.
CPC ......... *G06Q 20/353* (2013.01); *G06Q 20/202* (2013.01); *G06Q 20/204* (2013.01)

(58) Field of Classification Search
CPC ........ G06Q 40/00–40/10; G06Q 20/00–20/10; G06Q 20/102; G06Q 10/00–10/06; G06Q 30/00–30/10; H04W 4/18; H04W 4/183; H04W 4/185
USPC ... 705/4, 14.39, 26.8, 27.1, 7.32, 12, 37, 39, 705/36 R, 300, 329, 35, 36, 40; 455/414.1
See application file for complete search history.

(56) References Cited

U.S. PATENT DOCUMENTS

| | | | |
|---|---|---|---|
| 6,167,385 A | 12/2000 | Hartley-Urquhart | |
| 6,941,281 B1 * | 9/2005 | Johnson | G06Q 20/04 705/35 |
| 7,181,427 B1 | 2/2007 | DeFrancesco et al. | |
| 7,353,203 B1 * | 4/2008 | Kriplani | G06Q 20/02 705/39 |

(Continued)

FOREIGN PATENT DOCUMENTS

| | | |
|---|---|---|
| WO | 99/03076 A1 | 1/1999 |
| WO | 2012/150985 A1 | 11/2012 |

OTHER PUBLICATIONS

Non-Final Office Action mailed on Jan. 8, 2015, for U.S. Appl. No. 14/491,958, of Poursartip, A., et al., filed Sep. 19, 2014.

(Continued)

*Primary Examiner* — Olusegun Goyea
(74) *Attorney, Agent, or Firm* — Mattingly & Malur, PC

(57) ABSTRACT

A system and method for calculating crowdfunding terms based on a financial history of a merchant is described. The crowdfunding terms include an approved funding amount and repayment terms including a portion of transactions processed for the merchant by the payment processing system to withhold for repayment of the approved funding amount plus earnings to investors. The a payment processing system may withhold the portion of the transactions processed for the merchant by the payment processing system for repayment of the approved funding amount plus earnings to the investors, apportion the portion of the transactions processed for the merchant by the payment processing system amongst the investors, and transmit, by the payment processor system, the apportioned amount to each investor.

27 Claims, 9 Drawing Sheets

(56) References Cited

U.S. PATENT DOCUMENTS

| | | |
|---|---|---|
| 7,953,653 B2 | 5/2011 | Siggers et al. |
| 8,239,227 B2 | 8/2012 | Megiddo et al. |
| 8,666,847 B1 | 3/2014 | Blank et al. |
| 8,732,040 B1 | 5/2014 | Prabhune et al. |
| 8,799,133 B2 | 8/2014 | Gula, IV |
| 2002/0038277 A1 | 3/2002 | Yuan |
| 2002/0174061 A1 | 11/2002 | Srinivasan et al. |
| 2003/0101107 A1 | 5/2003 | Agarwal et al. |
| 2004/0054625 A1 | 3/2004 | Kellogg et al. |
| 2004/0064398 A1* | 4/2004 | Browne ............ G06Q 40/04 705/37 |
| 2004/0193540 A1 | 9/2004 | Brown et al. |
| 2006/0095350 A1 | 5/2006 | Hall et al. |
| 2007/0117601 A1 | 5/2007 | Van Luchene |
| 2007/0156579 A1 | 7/2007 | Manesh |
| 2007/0156584 A1 | 7/2007 | Barnes et al. |
| 2007/0174191 A1 | 7/2007 | Keaton et al. |
| 2007/0255635 A1 | 11/2007 | Multer et al. |
| 2007/0255653 A1* | 11/2007 | Tumminaro ......... G06Q 20/10 705/39 |
| 2008/0033825 A1 | 2/2008 | Goldin |
| 2008/0052229 A1 | 2/2008 | Sheinker et al. |
| 2008/0109348 A1 | 5/2008 | Saxena et al. |
| 2008/0154769 A1 | 6/2008 | Anderson et al. |
| 2009/0043697 A1 | 2/2009 | Jacobs et al. |
| 2010/0228651 A1 | 9/2010 | Becerra et al. |
| 2010/0268667 A1* | 10/2010 | King ................ G06Q 40/04 705/36 R |
| 2010/0299251 A1 | 11/2010 | Thomas |
| 2010/0306071 A1 | 12/2010 | Kay |
| 2011/0055056 A1 | 3/2011 | Kwatinetz |
| 2011/0202445 A1 | 8/2011 | Torres |
| 2011/0251870 A1 | 10/2011 | Tavares et al. |
| 2012/0011071 A1 | 1/2012 | Pennock et al. |
| 2012/0022945 A1 | 1/2012 | Falkenborg et al. |
| 2012/0054097 A1 | 3/2012 | Frohwein et al. |
| 2012/0066033 A1 | 3/2012 | Frohwein et al. |
| 2012/0089436 A1 | 4/2012 | Tavares et al. |
| 2012/0143649 A1 | 6/2012 | Aubertin |
| 2012/0191525 A1 | 7/2012 | Singh et al. |
| 2012/0209734 A1 | 8/2012 | Brooks et al. |
| 2012/0226595 A1 | 9/2012 | Torres |
| 2012/0233010 A1 | 9/2012 | Frohwein et al. |
| 2012/0233090 A1 | 9/2012 | Tavares et al. |
| 2012/0239552 A1 | 9/2012 | Harycki |
| 2012/0271765 A1 | 10/2012 | Cervenka et al. |
| 2013/0054484 A1* | 2/2013 | Hoeflinger ......... G06Q 30/02 705/329 |
| 2013/0085804 A1 | 4/2013 | Leff et al. |
| 2013/0124432 A1 | 5/2013 | Thibodeau |
| 2013/0138544 A1 | 5/2013 | Chapman |
| 2013/0185228 A1 | 7/2013 | Dresner et al. |
| 2013/0204664 A1* | 8/2013 | Romagnolo ....... G06Q 30/0203 705/7.32 |
| 2013/0226688 A1* | 8/2013 | Harvilicz ........... G06Q 30/02 705/14.39 |
| 2013/0268417 A1 | 10/2013 | Sgueglia |
| 2013/0332265 A1 | 12/2013 | Sossaman, II et al. |
| 2014/0006202 A1 | 1/2014 | Frohwein et al. |
| 2014/0025473 A1 | 1/2014 | Cohen |
| 2014/0032298 A1* | 1/2014 | Corrie ............ G06Q 30/0246 705/14.27 |
| 2014/0032307 A1* | 1/2014 | Corrie ............ G06Q 30/0246 705/14.45 |
| 2014/0032308 A1* | 1/2014 | Corrie ............ G06Q 30/0246 705/14.45 |
| 2014/0032309 A1* | 1/2014 | Corrie ............ G06Q 30/0246 705/14.45 |
| 2014/0032310 A1* | 1/2014 | Corrie ............ G06Q 30/0246 705/14.45 |
| 2014/0040157 A1 | 2/2014 | Cohen et al. |
| 2014/0052668 A1 | 2/2014 | Cameron |
| 2014/0058804 A1* | 2/2014 | Zhou ................ G06Q 10/101 705/12 |
| 2014/0143120 A1* | 5/2014 | Clarke ............ G06Q 40/04 705/37 |
| 2014/0143124 A1 | 5/2014 | Sanders |
| 2014/0143405 A1 | 5/2014 | Pavlidis et al. |
| 2014/0164049 A1* | 6/2014 | Yakos ............ G06Q 10/0633 705/7.27 |
| 2014/0171039 A1* | 6/2014 | Bjontegard ....... H04L 29/06034 455/414.1 |
| 2014/0229397 A1 | 8/2014 | Fink |
| 2014/0244361 A1 | 8/2014 | Zhang et al. |
| 2014/0244486 A1* | 8/2014 | Abril ............ G06Q 20/223 705/39 |
| 2014/0279682 A1* | 9/2014 | Feldman ........... G06Q 40/06 705/36 R |
| 2014/0304137 A1* | 10/2014 | Olson .............. G06Q 40/04 705/37 |
| 2014/0316823 A1* | 10/2014 | Cooper ............ G06Q 40/08 705/4 |
| 2014/0344037 A1 | 11/2014 | Dunbar et al. |
| 2014/0351116 A1* | 11/2014 | Hoff ................ G06Q 40/025 705/38 |
| 2014/0358766 A1* | 12/2014 | Nayyar .............. G06Q 40/025 705/38 |
| 2015/0039490 A1 | 2/2015 | Forrester et al. |
| 2015/0100475 A1 | 4/2015 | Cummings et al. |
| 2015/0149333 A1 | 5/2015 | Yaplee et al. |
| 2015/0161606 A1 | 6/2015 | Lee |
| 2015/0170286 A1 | 6/2015 | Gingell et al. |

OTHER PUBLICATIONS

Non-Final Office Action mailed on Mar. 27, 2015, for U.S. Appl. No. 14/491,965, of Poursartip, A., et al., filed Sep. 19, 2014.
Non-Final Office Action mailed on Mar. 27, 2015, for U.S. Appl. No. 14/491,967, of Poursartip, A., et al., filed Sep. 19, 2014.
Restriction Requirement mailed on May 7, 2015, for U.S. Appl. No. 14/167,931, of Brock, Z., filed Jan. 29, 2014.
Final Office Action mailed on May 20, 2015, for U.S. Appl. No. 14/491,958, of Poursartip, A., et al., filed Sep. 19, 2014.
Advisory Action mailed on Jul. 27, 2015, for U.S. Appl. No. 14/491,958, of Poursartip, A., et al., filed Sep. 19, 2014.
Non-Final Office Action mailed on Aug. 27, 2015, for U.S. Appl. No. 14/675,127, of Shearer, D. J., et al., filed Mar. 31, 2015.
Non-Final Office Action mailed on Apr. 27, 2016, for U.S. Appl. No. 14/616,515, of Boates, B., et al., filed Feb. 6, 2015.
Non-Final Office Action mailed on May 5, 2016, for U.S. Appl. No. 14/491,967, of Poursartip, A., et al., filed Sep. 19, 2014.
Final Office Action mailed on May 12, 2016, for U.S. Appl. No. 14/167,931, of Brock, Z., et al., filed Jan. 29, 2014.
Non-Final Office Action mailed on Oct. 8, 2015, for U.S. Appl. No. 14/167,931, of Brock, Z., et al., filed Jan. 29, 2014.
Final Office Action mailed on Oct. 8, 2015, for U.S. Appl. No. 14/491,967, of Poursartip, A., et al., filed Sep. 19, 2014.
Final Office Action mailed on Nov. 6, 2015, for U.S. Appl. No. 14/491,965, of Poursartip, A., et al., filed Sep. 19, 2014.
Non-Final Office Action mailed on Jan. 5, 2016, for U.S. Appl. No. 14/491,958, of Poursartip, A., et al., filed Sep. 19, 2014.
Non-Final Office Action mailed on Aug. 27, 2015, for U.S. Appl. No. 14/540,947, of Baker, G. K., et al., filed Nov. 13, 2014.
Non-Final Office Action mailed on Jan. 21, 2016, for U.S. Appl. No. 14/675,257, of Shearer, D. J., et al., filed Mar. 31, 2015.
Non-Final Office Action mailed on Feb. 12, 2016, for U.S. Appl. No. 14/540,947, of Baker, G. K., et al., filed Nov. 13, 2014.
Final Office Action mailed on Mar. 31, 2016, for U.S. Appl. No. 14/675,127, of Shearer, D. J., et al., filed Mar. 31, 2015.
Final Office Action mailed Oct. 21, 2016, for U.S. Appl. No. 14/491,967, of Poursartip, A., et al., filed Sep. 19, 2014.
Non-Final Office Action mailed Nov. 3, 2016, for U.S. Appl. No. 14/675,127, of Shearer, D.J., et al., filed Mar. 31, 2015.
Non-Final Office Action mailed Nov. 28, 2016, for U.S. Appl. No. 14/491,963, of Poursartip, A., et al., filed Sep. 19, 2014.
Giusti, A.C., "Want More Revenue? Enhance The Offers: Carefully matching merchants with the right products and ensuring agents

(56) References Cited

OTHER PUBLICATIONS know them well can dictate how much an ISO may earn from value-added services," ISO & Agent 7.4, dated May 1, 2011, pp. 2.
Leung, L., "PayPal ramps up small-business loans," The Orange County register, Journal—Gazette [Ft. Wayne, Ind], dated Feb. 10, 2014, pp. 2.
Non-Final Office Action mailed Dec. 19, 2016, for U.S. Appl. No. 14/491,965, of Poursartip, A., et al., filed Sep. 19, 2014.
Non-Final Office Action mailed Jan. 11, 2017, for U.S. Appl. No. 14/167,931, of Brock, Z., filed Jan. 29, 2014.
Examiner's Answer to Appeal Brief mailed Jan. 27, 2017, for U.S. Appl. No. 14/491,958, of Poursartip, A., et al., filed Sep. 19, 2014.
Non-Final Office Action mailed Feb. 10, 2017, for U.S. Appl. No. 14/622,605, of Scott, J.B., et al., filed Feb. 13, 2015.
Final Rejection mailed Feb. 17, 2017, for U.S. Appl. No. 14/616,515, of Boates, B., et al., filed Feb. 6, 2015.
Non-Final Office Action mailed Mar. 1, 2017, for U.S. Appl. No. 14/616,520, of Boates, B., et al., filed Feb. 6, 2015.
Notice of Allowance mailed Mar. 30, 2017, for U.S. Appl. No. 14/491,967, of Poursartip, A., et al., filed Sep. 19, 2014.
Final Office Action mailed on Apr. 6, 2017, for U.S. Appl. No. 14/540,947, of Baker, G.K., filed Nov. 13, 2014.
Final Office Action mailed Apr. 10, 2017, for U.S. Appl. No. 14/675,127, of Shearer, D.J., et al., filed Mar. 31, 2015.
Non-Final Office Action mailed on Jun. 17, 2016, for U.S. Appl. No. 14/491,965, of Poursartip, A., et al., filed Sep. 19, 2014.
Non-Final Office Action mailed on Jun. 17, 2016, for U.S. Appl. No. 14/622,605, of Scott, J.B., et al., filed Feb. 13, 2015.
Non-Final Office Action mailed Sep. 9, 2016, for U.S. Appl. No. 14/540,947, of Baker, G. K., filed Nov. 13, 2014.
Final Office Action mailed Oct. 7, 2016, for U.S. Appl. No. 14/675,257, of Shearer, D. J., et al., filed Mar. 31, 2015.
"Oracle Retail Advanced Inventory Planning," www.oracle.com, pp. 1-2 (2013).
Barr, A., "Update 5—Amazon offering loans to its on line sellers," www.reuters.com, dated Sep. 27, 2012, Retrieved from the Internet URL: http://www.reuters.comfarticle/amazon-lending-idUSL1E8KRA1020120927? type=companyNews, on Jun. 1, 2017, pp. 1-4.
Non-Final Office Action dated May 10, 2017, for U.S. Appl. No. 14/602,486, of Fern, A.J., et al., filed Jan. 22, 2015.
Non-Final Office Action dated May 16, 2017, for U.S. Appl. No. 14/676,678, of Scott, J.B., et al., filed Apr. 1, 2015.
Notice of Allowance dated May 31, 2017, for U.S. Appl. No. 14/675,257, of Shearer, D.J., et al., filed Mar. 31, 2015.
Notice of Allowance dated Jun. 7, 2017, for U.S. Appl. No. 14/491,963, of Poursartip, A., et al., filed Sep. 19, 2014.
Notice of Allowance dated Jun. 22, 2017, for U.S. Appl. No. 14/540,947, of Baker, G.K., filed Nov. 13, 2014.

\* cited by examiner

MOBILE POINT-OF-SALE CROWDFUNDING

BACKGROUND

Mobile payment systems allow individuals and merchants to accept debit and credit cards on their smartphone, tablet, or other mobile computing device. Some mobile payment systems include a payment card reader that reads and transmits payment card information to a connected mobile computing device. The mobile computing device then transmits the payment card information and other transaction information to a payment processing system to be processed. Typically, this information is transmitted over an internet connection or stored for later batch transmission if an internet connection is not available.

A merchant using a mobile payment system may require additional capital, but may not desire to fill out a loan application, be subjected to a credit check, or be required to make regular loan payments. One way for a merchant to acquire additional funds is through crowdfunding. In crowdfunding individuals can collectively pool their funds to support a cause or project. Often, this type of crowdfunding can be performed using an intermediary service that unites individuals that are willing to contribute funds for projects and other individuals that are seeking funds for their projects. However, investors may not have an understanding of the financial background of the merchant regarding investment amount, risk level, and ability of the merchant to repay the investment. Similarly, investors may not have a guarantee that a merchant will use revenue to repay the investment.

BRIEF DESCRIPTION OF THE DRAWINGS

The techniques described herein are illustrated by way of example, and not by way of limitation, in the figures of the accompanying drawings, in which like reference numerals are used to refer to similar elements.

Figure 1:
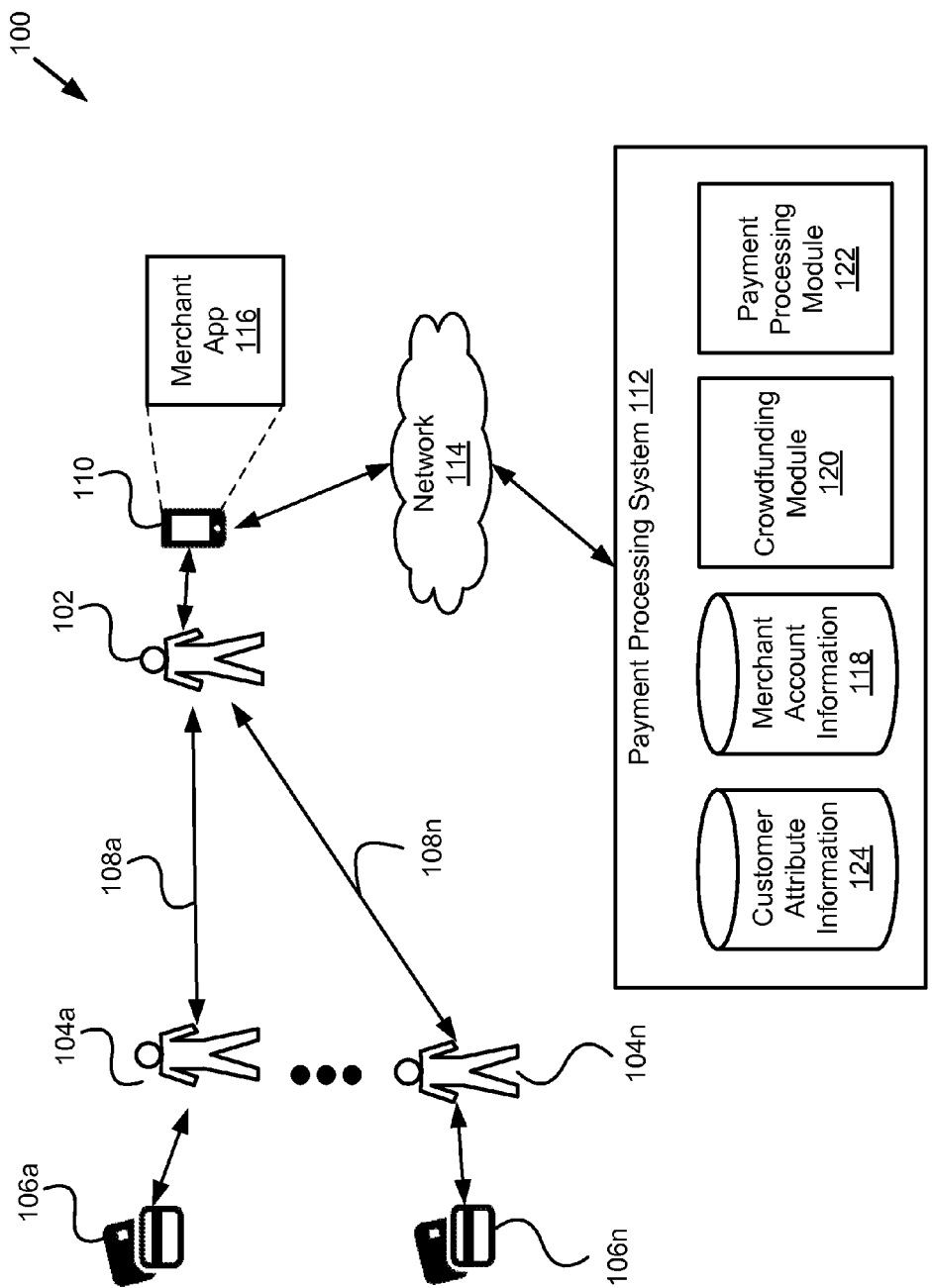
FIG. 1 illustrates an example architecture of a payment communication system for enabling transactions between merchants, investors, and customers.

The figures depict various embodiments of the techniques described herein for purposes of illustration only. It should be readily recognized from the following discussion that alternative embodiments of the structures and methods illustrated herein may be employed without departing from the principles of the techniques described herein.

DETAILED DESCRIPTION

Various embodiments of the disclosure are discussed in detail below. While specific embodiments are discussed, it should be understood that this is done for illustration purposes only. It will be recognized that other components and configurations may be used without parting from the spirit and scope of the disclosure.

Systems and methods in accordance with various embodiments of the present disclosure overcome one or more of the above-referenced and other deficiencies in conventional approaches to providing funding (e.g., cash advances, capital investments, funds, financing, etc.) to merchants. In particular, the techniques introduced herein provide a method for creating crowdfunding terms for a crowdfunding project by evaluating financial transactions conducted for a merchant through a payment processing system. The techniques also include collecting investment funds, collecting repayment and earning funds, and disbursing funds according to the crowdfunding terms. Various embodiments of the techniques disclosed herein may provide a method for investors to receive repayment directly from financial transaction funds.

A crowdfunding project typically involves a collective effort of entities (e.g., individuals or businesses) to contribute funds to a particular cause or business. As described herein, a payment processing system can help merchants to seek funding for their businesses from investors. Specifically, in response to a request from a merchant to create a crowdfunding project, the payment processing system may calculate crowdfunding terms based on a financial history of the merchant (e.g., a history of transactions processed for the merchant by the payment processing system), collect investment funds, and disburse repayment of investments and earnings to investors. In exchange for contributing funds, investors can receive equity (e.g., shares corresponding to some portion of the business), debt (e.g., debt instruments to be repaid by the business), a portion of profits or revenue (e.g., a percentage of transactions processed for the merchant by the payment processor system), discounts, and/or other forms of remuneration. Further, an investment in a crowdfunding project may be in exchange for a flat or variable amount of earnings, a percentage of revenue or profits, or tied to other factors, as described in further detail herein.

For example, assume a merchant, e.g., a coffee shop owner, wishes to purchase a new espresso machine for $2000, but does not have sufficient capital for the purchase. The merchant may request that the payment processing system create a crowdfunding project to raise the capital for the purchase. In one embodiment, the merchant may make the request through an interface on a mobile POS terminal. The merchant may include specific terms (e.g., requested funding amount, repayment terms, investor interest, investor criteria, etc.) in the request. For example, the merchant may indicate that she is willing to provide a 10% return on investment to investors in the crowdfunding project and provide investor criteria indicating that she wishes to send offers to only those customers who spend more than $15 dollars at her coffee shop per week.

The mobile POS terminal sends the request to the payment processing system and the payment processing system evaluates the merchant's financial history (e.g., the history of transactions processed for the merchant by the payment processing system) to determine whether the merchant is eligible for a crowdfunding project. If the payment processing system determines that the merchant is eligible for a crowdfunding project, the payment processing system calculates and presents crowdfunding terms for final approval by the merchant. The crowdfunding terms define the relationship between the merchant and the investors and may include an approved funding amount, repayment terms, earnings (e.g., interest, dividends, etc.) to be distributed to investors, fees and the like. For example, the crowdfunding terms may dictate that the owner will repay the initial investment and the 10% return on investment to the investors along with a 2% fee to the payment processing system for creation and management of the crowdfunding project. Further, instead of approving the 10% return on investment to investors, the payment processing system may suggest to or impose on the merchant a greater or lesser return based on the eligibility determination.

Upon approval of the crowdfunding terms, the merchant may begin collecting funds from investors. The merchant may collect funds from investors via a web page, via the mobile POS terminal in conjunction with or independent from a POS transaction for goods or services provided by the merchant (e.g., a cup of coffee), etc. For example, based on the investor criteria defined by the merchant, a regular customer of the coffee shop may be presented an offer to invest in the crowdfunding project when he pays for his cup of coffee via the mobile POS terminal used by the merchant for processing payment for the cup of coffee. For instance, the customer may be presented with an offer to invest an additional 10% of the price of his coffee, a fixed amount (e.g., $1), or some other amount to the crowdfunding project. The offer may be presented contemporaneously with the sale of the cup of coffee to the customer on a display of the mobile POS terminal, or subsequent to the sale on a digital receipt transmitted for viewing on a display of a device of the customer. If the customer accepts the offer, the mobile POS terminal can be used to collect the funds for the crowdfunding project (e.g., as part of the purchase transaction or as a separate transaction). The payment processing system may track the amounts invested in the crowdfunding campaign by each customer/investor. The funds for the crowdfunding campaign may be disbursed to the merchant by the payment processing system once the $2000 funding goal has been met or as the funds are collected.

The payment processing system collects repayment of the investment funds, the earnings, and/or fees by withholding a portion of funds from subsequent POS transactions processed for the merchant by the payment processing system. For example, each time the payment processing system processes a payment for the merchant, the payment processing system may automatically deduct 10% (i.e., a withholding rate, which may be equal to or different from the ultimate rate of return on investment) of the POS transaction amount for repayment of the initial investment, earnings, and/or the fee and deposit the remainder of the POS transaction amount to the merchant's account. Thus, if the merchant conducts a total of $500 in POS transactions each day, the payment processing system would withhold $50 for repayment to the crowdfunding project. The repayment may be apportioned to each investor according to his/her investment (e.g., as a percentage of the investment, number of shares, etc.) and the repayment is transmitted to the investors (e.g., by wire transfer, refund on their payment card, etc.). Thus, the merchant has conveniently acquired a new espresso machine, customers may benefit from the new espresso machine, and investors have received a return on investment with the added security that the techniques described herein provides (e.g., underwriting of the crowdfunding project by the payment processing system and direct repayment to the investors from POS transactions processed for the merchant by the payment processing system).

Advantageously, the techniques introduced herein allow an investor to have some security (e.g., to safeguard against fraud or failure to repay the investment or earnings according to the crowdfunding terms) in his investment in a merchant, particularly when the merchant is a small business. For example, a payment processing system may withhold a portion of funds from financial transactions processed for the merchant for payment to investors prior to disbursing the transaction funds to the merchant. Additionally, a payment processing system may have a record of financial transactions processed for the merchant by the payment processing system, which the payment processing system can use to calculate the crowdfunding terms, thus an investor can have some assurance of financial stability, while the merchant retains its financial books in confidentiality.

FIG. 1 illustrates an example architecture of a payment communication system 100 for enabling transactions between merchants 102 and customers 104 (customers 104a . . . 104n may be referred to herein individually or collectively as 104). In the example of FIG. 1, a customer 104 may use any of a variety of payment cards 106 (payment cards 106a . . . 106n may be referred to herein individually or collectively as 106) when participating in a point-of-sale (POS) transaction 108 with a merchant 102. In some embodiments, the payment cards 106 may include one or more magnetic stripes for providing payment card and customer information when swiped in a card reader. In other embodiments, other types of payment cards may be used, for example smart cards having a built in integrated circuit including a memory chip, a radio frequency identification tag, and the like. Payment cards are discussed in more detail elsewhere herein, for example in reference to FIG. 8.

The example of FIG. 1 illustrates multiple customers 104 . . . 104n, multiple payment cards 106a . . . 106n, and multiple transactions 108a . . . 108n (POS transactions 108a . . . 108n may be referred to herein individually or collectively as 108) to illustrate that a merchant may have multiple customers 104 participating in multiple financial transactions with the merchant 102. Some of the customers 106 may be customers purchasing items or services from the merchant 102. Some of the customers 104 may be investors investing in a crowdfunding project of the merchant 102. Some of the customers 104 may be both customers purchasing items and also investors in the crowdfunding project. Although two customers 104a and 104n (as well as payment cards 106a and 106n and transactions 108a and 108n) are depicted in the example FIG. 1, it should be understood that any number of customers 104 can be present.

The payment communication system 100 in the example of FIG. 1 illustrates a POS terminal, such as merchant device 110, associated with a merchant 102 that participates in a payment processing service provided by a service provider. The POS terminal may be referred to herein as a POS terminal, a mobile POS terminal, or simply as its constituent parts (e.g., the merchant device 110 and/or a payment card reader). The merchant device 110 may be any appropriate device configured to send and receive requests, messages, voice calls or other types of information over the network 114. In some embodiments the merchant device 110 may be a computing device (e.g. a mobile computing device) such as a smartphone or a tablet. In some embodiments, the merchant device 110 could be any device with a cellular connection and a communication port, such as an audio input/output port.

Each merchant device 110 may optionally include an instance of a merchant application 116 executed on the merchant device 110. For example, the merchant application 116 may be a register application that provides POS functionality to enable the merchant 102 to accept payments at a POS location using the merchant device 110. The merchant application 116 on the merchant device 110 may send transaction information via network 114 to the payment processing system 112 (e.g., as the transaction is being conducted at the POS location). As further explained in reference to FIG. 6, the transaction information may include information regarding the time, place, and the amount of each respective transaction, information related to the item acquired, payment card information, as well as additional information, such as customer information.

In addition, the merchant application 116, when completing a transaction, may receive a receipt email address, phone number, or other contact information for the customer in order to provide a receipt through email, text message, or the like. In one embodiment, the merchant application 116 generates the receipt and transmits the receipt to the customer using the contact information provided by the customer. In another embodiment, the merchant application 116 may provide the contact information to the payment processing system 112 along with the transaction information and the payment processing system 112 may generate and transmit a receipt to the customer.

The payment processing system 112 enables a payment service provider to provide a payment service for merchants 102 to conduct POS transactions 108 with a plurality of customers 104, such as for selling services and/or products to the customers 104. In addition to processing POS transactions 108, the payment processing system 112 may create a crowdfunding project, calculate crowdfunding terms, collect investment funds, track investors and investment amounts, track customer attributes, track merchant financial information, etc., as described in further detail elsewhere herein. The payment processing system 112 includes a payment processing module 122 that receives transaction information for processing financial transactions made through a merchant application 116, a crowdfunding module 120 that enables a crowdfunding project, and merchant account information 118 including a financial history for a merchant 102, and customer attribute information 124. While merchant account information 118 and customer attribute information 124 are depicted in the example of FIG. 1 as separate data collections, the information may be combined into a single data structure (e.g., database, table, or the like). The payment processing system 112 and its components are also described in further detail throughout this disclosure, for example in reference to FIG. 7.

The crowdfunding module 120 determines whether a merchant is eligible for a crowdfunding project and generates crowdfunding terms, such as an approved funding amount, approved fund terms (e.g., investment terms), repayment terms (e.g., a fee for facilitating the crowdfunding, a rate for repayment, etc.). In some embodiments, the crowdfunding terms are based solely on the history of transactions processed for the merchant by the payment processing system. In some embodiments, the crowdfunding terms may be based on other financial information, such as merchant revenue history, merchant profit history, merchant assets, and financial data associated with other businesses that are in a similar category, location, etc. as the merchant.

The crowdfunding terms may include, for example, shares in the business that are available for purchase, a current share price, a return on investment, repayment terms, any conditions that need to be satisfied before any funds will be repaid by the merchant, and the like. An investment in a crowdfunding project may be in exchange for a flat or variable amount of earnings, a percentage of revenue or profits, or tied to other factors, as described in further detail herein. In some embodiments, an investment may be in exchange for equity in a business of the merchant. The repayment terms may include, for example, a duration of repayment, a maximum earning amount, a minimum earning amount, frequency of repayment, and that a certain percent of the business's profits or revenue (e.g., as processed for the merchant by the payment processing system) will be set aside for paying such earnings.

These determinations can be made, for example, by applying various machine learning techniques (e.g., ensemble learning methods) to evaluate various factors associated with the merchant 102. For example, the crowdfunding module 120 may evaluate financial transactions conducted for the merchant 102 by the payment processing module 122. To determine whether a particular merchant 102 qualifies for a crowdfunding project and the crowdfunding terms, the crowdfunding module 120 can utilize a classifier, for example, based on a random forest approach, to determine whether factors describing the merchant 102 qualify the merchant 102. As mentioned, these factors can be, for example, the merchant's transaction history (e.g., a history of transactions involving the merchant, such as those transactions processed for the merchant 102 by the payment processing system 112), anticipated transactions (e.g., the amount and/or volume of financial transactions that are projected that the merchant 102 will perform through the payment processing system 112 in the future, for example when the merchant 102 has received and used the investment funds to increase business), the type of business, and a GPV over a particular time period (e.g., over the past fiscal quarter or year). These factors can be determined from information aggregated by the payment processing module 122, retrieved from the merchant account information 118 and/or the customer attribute information 124, received from another financial institution, etc. In other words, the merchant need not complete applications for requesting capital or undergo extensive valuations. For example, over the previous year, the merchant may have conducted $100,000 in financial transactions through the payment processing system. Based on this transaction volume and various other factors associated with the merchant, the crowdfunding module 120 may determine that the merchant can support a crowdfunding campaign in the amount of $8,000 with an $800 fee (e.g., $800 in earnings to the investors and, in some embodiments, a fee to the payment processing system for facilitating the funding).

The crowdfunding module 120 may also determine the crowdfunding terms, approved fund terms, and repayment terms using similar techniques. For example, the crowdfunding module 120 can apply normal regression analysis on the merchant's previous financial transactions conducted by the merchant 102 through the payment processing module 122 or another financial institution to make such determinations. In some embodiments, the earnings to be paid to the investors for the investment is based on a specified percentage (e.g., 14 percent) of the approved funding amount. In some embodiments, the rate of repayment is a specified percentage (e.g., 10 percent) of each transaction processed for the merchant. In some embodiments, the rate of repayment is determined based on a 10-month repayment model. This model can be determined by forecasting the merchant's GPV for the subsequent year.

Once the crowdfunding module 120 determines that the merchant 102 qualifies for a crowdfunding project, the details of the crowdfunding project (e.g., the crowdfunding terms) can be sent to the merchant 102, for example, via the merchant device 110, via email, etc. Depending on the embodiment, the details of the crowdfunding can be sent to the computing device and/or server over a network (e.g., the Internet) through a web-based environment or may be sent to the merchant through electronic communication (e.g., by e-mail or a text message).

In some embodiments, the crowdfunding module 120 may determine that the merchant 102 qualifies up to a maximum amount of funding. In such embodiments, the merchant 102 can request an amount that is the same or less than the maximum amount of funding (e.g., a target cash advance amount). In some embodiments, the merchant 102 may request an amount of funding that is higher than the amount of funding that the merchant 102 was pre-qualified to receive. In such embodiments, the crowdfunding module 120, alone or in combination with human feedback, can evaluate the request to determine whether the merchant 102 should receive the requested higher crowdfunding amount.

The payment processing module 122 is configured to process financial transactions between the merchant 102 and customers 104. In various embodiments, while processing financial transactions for the merchant 102, the payment processing module 122 is also configured to deduct a portion of the merchant's earnings from these financial transactions as remuneration to investors for investment in a crowdfunding project for the merchant. The amount deducted from the merchant's earning from the financial transactions can be based on a rate for repayment, an earnings amount to be distributed to investors, and/or a fee for supporting the crowdfunding project, as specified in the crowdfunding terms. These deductions can be made on a per-transaction basis or from aggregated financial transactions conducted by the merchant 102 over a certain time period (e.g., hourly, daily, weekly, bi-weekly, monthly, or yearly). In some embodiments, the payment processing module 122 can deduct a set amount (e.g., $5, $10, etc.) from financial transactions processed over a particular period of time.

The payment processing system 112 may also include merchant account information 118 and customer attribute information 124, which may be stored on one or more data storage devices. To accept electronic payments for POS transactions, the merchant 102 may create a merchant account on the payment processing system 112 by providing information describing the merchant 102, including, for example, merchant name, contact information (e.g., telephone numbers, the merchant's address, and one or more financial accounts to which funds collected from customers will be deposited). The data storage device is an information source (e.g., a non-transitory computer-readable medium) for storing and providing access to data. The data stored (e.g., the merchant account information 118 and/or customer attribute information 124) by the data storage device may be organized and queried using various criteria including any type of data stored on the data storage device and may include data tables, databases, or other organized collections of data. The components of the payment processing system 112 may be communicatively coupled to the data storage device and may access (e.g., read, write, modify, delete, etc.) the data stored therein.

The merchant account information 118 stored in the data storage device may include financial account information (e.g., routing number for a checking account, balance, etc.), financial transaction data, account balance data, merchant attribute data, merchant financial history, merchant finances, merchant financial history and related MCA terms for past merchants, etc. For example, financial transaction data may include a history of financial transactions processed through the payment processing system 112 or another financial institution. The account balance data may include account balances for the merchant 102 at one or more of the payment processing system 112, the financial institution 126, and/or one or more other financial institutions. Merchant attribute data may include the type of merchant 102 (taxi service, food cart, retail store), whether the merchant 102 has a brick-and-mortar store, etc., which may be reflective of how prone the merchant business is to continue operations and be able to repay a cash advance.

The customer attribute information may include, for example. a transaction frequency (e.g., the frequency of purchases made by the customer 104 and/or financial transactions entered into between the customer 102 and the merchant 102), customer attributes, percentage or equity owned, investor criteria, crowdfunding terms, repayment terms, and fund terms.

The merchant account information 118 and/or the customer attribute information 124 may be received from the payment processing module 122, another financial institution, the crowdfunding module 120, and/or other possible third-party information sources (e.g., banks, third-party servers, etc.). In some embodiments, the merchant account information 118 and/or the customer attribute information 124 is aggregated by the payment processing module 122 and reflects the financial transactions processed by the payment processing module 122 through the payment processing system 112. For example, the merchant account information 118 may reflect the POS transactions 108 processed by the payment processing system 112 via the merchant device 110.

As discussed herein, the crowdfunding module 120 accesses and determines crowdfunding terms based at least on the merchant account information 118 and/or the customer attribute information 124. For example, the payment processing system 112 may receive a request to calculate crowdfunding terms and the crowdfunding module 120 may use merchant account information 118 to calculate crowdfunding terms for the particular merchant 102. In some embodiments, the crowdfunding module 120 uses information collected from other merchants (e.g., who use the payment processing system 112) to help determine eligibility and crowdfunding terms for the merchant 102. For example, the payment processing system 112 may compare the merchant 102 to other merchants operating similar businesses to determine likely revenue, earnings, and/or likely repayment of the funds. In response to the request, the payment processing system 112 may transmit the crowdfunding terms to a client device such as the merchant device 110 or a device associated with a customer 104 as described herein.

Figure 2:
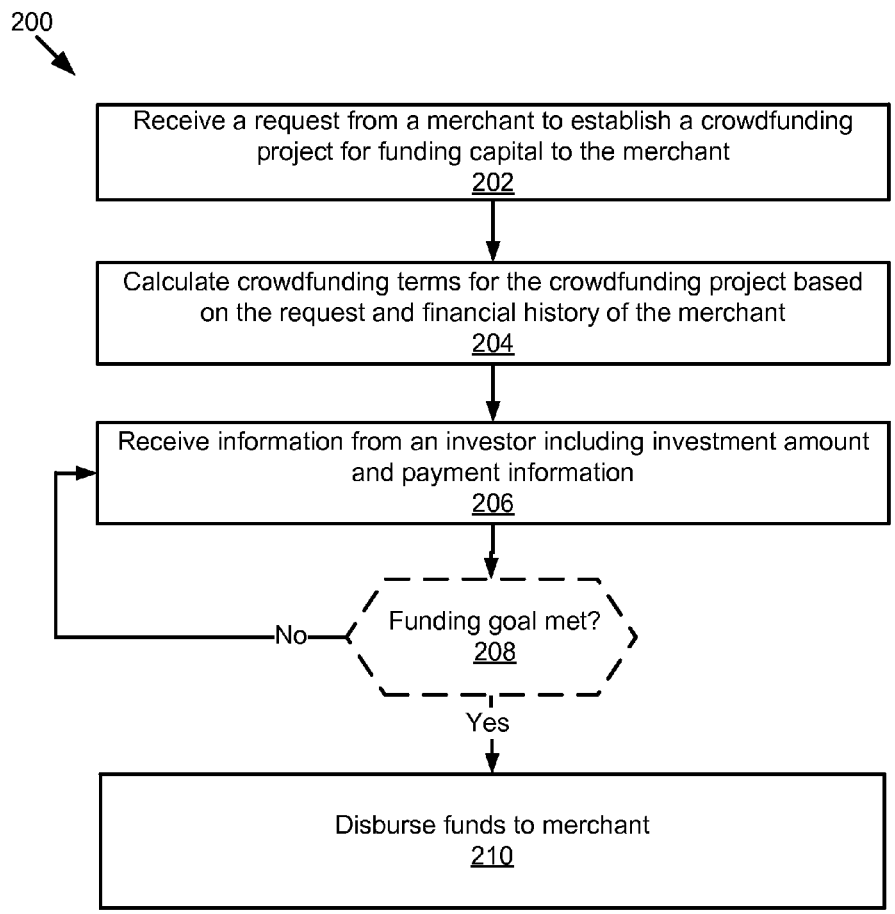
FIG. 2 is a block diagram of an example process for creating and funding a crowdfunding project.
Figure 3:
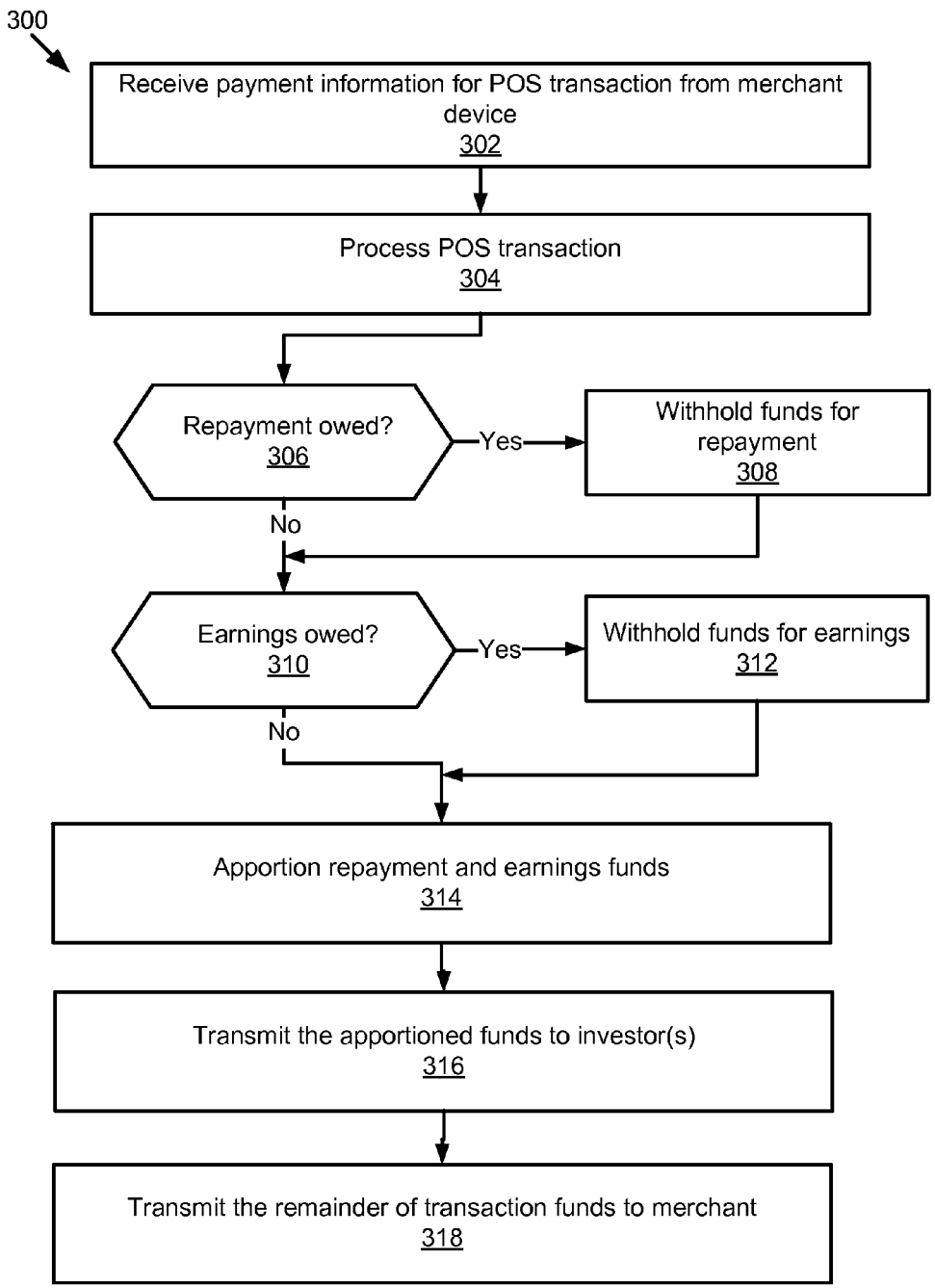
FIG. 3 is a block diagram of an example process for providing payments to investors in a crowdfunding project.
Figure 4:
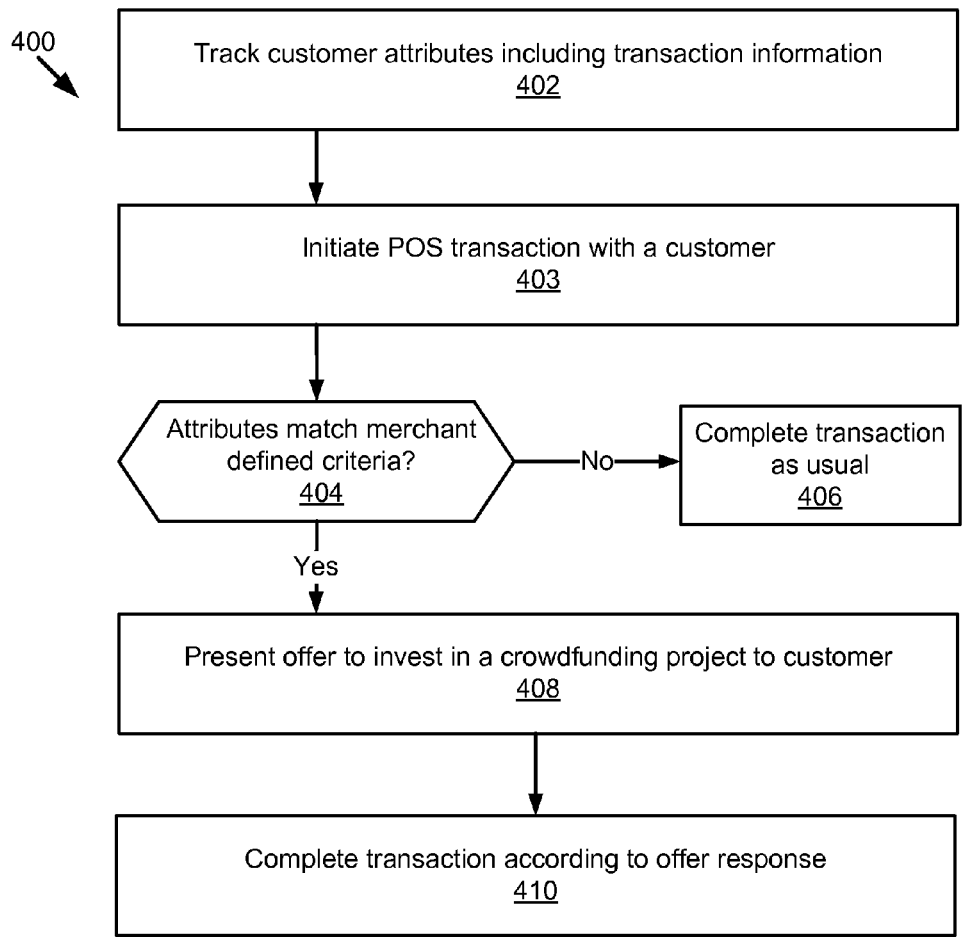
FIG. 4 is a block diagram of an example process for identifying investors to invest in a crowdfunding project.

The processes described in FIGS. 2-4 are each illustrated as a collection of blocks in logical flow diagrams, which represent a sequence of operations, some or all of which can be implemented in hardware, software, or a combination thereof. The order in which the blocks are described should not be construed as a limitation. Any number of the described blocks can be combined in any order and/or in parallel to implement the processes, or alternative processes, and not all of the blocks need be executed. For ease of description, the processes are described with reference to the environments, architectures and systems described in the examples herein, although the processes may be implemented in a wide variety of other environments, architectures and systems.

FIG. 2 is a block diagram of an example process 200 for creating and funding a crowdfunding project. At 202, the payment processing system 112 receives a request from a merchant to establish a crowdfunding project for providing capital to the merchant 102. In some embodiments, in order to request the creation of a crowdfunding project and/or the calculation of crowdfunding terms, the merchant 102 interacts with a mobile POS terminal, which may include a computing device (e.g., the merchant device 110) and a means to accept payment (e.g., a payment card reader). For example, the merchant 102 may select various options on a graphical user interface of the computing device, which may include a requested funding amount, requested fund terms, requested repayment terms, requested timeline, and other options as described elsewhere herein. The POS terminal, may then transmit the request to a payment processing system 112, which calculates crowdfunding terms in response to receiving the request. In other embodiments, the merchant 102 may use a computing device, such as a personal computer to request the creation of a crowdfunding project and/or calculation of crowdfunding terms via a web interface associated with the payment processing system 112.

Although, in the above example embodiments the merchant 102 takes the first step to request the creation of a crowdfunding project and/or calculation of crowdfunding terms, it should be understood that the payment processing system 112 may take the first steps toward creation a crowdfunding project. For example, the payment processing system 112 may evaluate a merchant's financial history, calculate crowdfunding terms, and communicate an offer to create a crowdfunding project to the merchant 102 based on the pre-calculated crowdfunding terms.

At 204, the crowdfunding module 120 calculates crowdfunding terms for the crowdfunding project based on the request and financial history of the merchant 102. For example, in response to receiving a request via a computing device (e.g., a mobile POS terminal, a web interface, etc.), the crowdfunding module 120 may evaluate the amount of funding being requested, fund terms, and merchant financial history (e.g., transaction history) to determine whether the merchant 102 qualifies for a crowdfunding project, crowdfunding terms, an approved funding amount, etc.

At 206, the payment processing system 112 receives information from an investor including an investment amount and payment information. In some embodiments, an investor can accept an offer to invest in a crowdfunding project and fund the investment via a mobile POS terminal, which transmits the information to the payment processing system 112. For example, a mobile POS terminal may present an offer to invest in a crowdfunding project to a customer 104 on a display of a mobile computing device associated with the mobile POS terminal (e.g., merchant device 110). The customer 104 may elect to accept the offer to invest an amount (e.g., an offered investment amount, a periodic investment, a modified investment amount, etc.) in the crowdfunding project and provide payment information (e.g., using a payment card reader of the mobile POS terminal). The mobile POS terminal may then transmit the investment amount and payment information to the payment processing system 112. In other embodiments, the investor can accept an offer to invest in the crowdfunding project and fund the investment via an interactive digital receipt received for a purchase from the merchant. The investor may contribute to the crowdfunding campaign using the same payment instrument used for the transaction reflected on the digital receipt or may provide a different form of payment. The digital receipt may then transmit the investment amount and the form of payment to the payment processing system 112. The crowdfunding module 120 may then record the investment information and the payment processing module 122 may process the crowdfunding transaction.

At 208, the crowdfunding module 120 may determine if the funding goal has been met. If, for example, the funding goal (e.g., an approved funding amount) has not been met after receiving the funds from the investor, the payment processing system 112 may withhold the funds from the merchant 102 until the funding goal has been met after additional investment funds have been received. In some embodiments, the crowdfunding module 120 may disburse the investment funds to the merchant 102 without the funding goal having been met (e.g., immediately, periodically, etc.). Withholding investment funds until the funding goal has been met improves investment security, that is, the merchant 102 is less likely to spend the investment funds other than to acquire a business asset, for example.

At 210, the payment processing system 112 disburses the funds to the merchant 102. Depending on the crowdfunding terms, the payment processing system 112 can allocate all of the investment at once or apportion the funds according to a schedule (e.g., periodically). Similarly, if the payment processing system 112 does not wait until the funding goal is met to disburse funds, the payment processing system 112 may disburse the funds as they are collected. To disburse the funds, the payment processing system 112 can access merchant account information 118 that describes financial account information (e.g., a routing number for a checking account) for the merchant 102 and electronically deposit the funds in the merchant's financial account. The merchant 102 can then access the funds directly from their financial account. Other approaches to providing the merchant 102 with the funds are possible including, for example, providing the merchant 102 with a financial payment card having a pre-set spending limit in the amount of the crowdfunding funds.

FIG. 3 is a block diagram of an example process 300 for providing payments (e.g., capital funding amount and earnings) to investors in a crowdfunding project. The payment processing system 112 receives transaction funds for a financial transaction from a customer 104, withholds a portion of the funds for repayment and earnings, and allocates to each investor their respective share of the funds. In some embodiments, the payment processing system 112 may pay earnings after a vesting term, after a predetermined time period, upon a determination that the business has reached profitability, after a determination that the business has purchased a capital asset (e.g., the espresso machine discussed in an example above, etc.), and/or based on the crowdfunding terms.

At 302, the payment processing module 122 receives payment information for a POS transaction (e.g., a purchase from the merchant 102) from the mobile POS terminal and, at 304 processes the payment information for the transaction. For example, a merchant 102 may accept a payment card (e.g., via swiping a payment card in the card reader) for the purchase using a mobile POS terminal, so that payment card information is transmitted via the network 114 to the payment processing system 112. The payment processing module 122 receives and processes the payment card information to retrieve funds for the purchase.

At 306, the crowdfunding module 120 determines whether repayment is owed to one or more investors (e.g., based on the crowdfunding terms and repayment history). In response to a determination that repayment is owed the crowdfunding module 120, at 308, directs the payment processing module 122 to withhold funds for repayment of the invested funds. In some embodiments, the payment processing module 122 may withhold the funds for repayment as a percentage of each POS transaction or as a percentage of a group of POS transactions processed for the merchant 102 by the payment processing module 122.

In some embodiments, an amount owed to one or more investors may include a repayment amount and an earnings amount (e.g., interest, dividends, or the like, to be paid to investors). At 310, the crowdfunding module 120 determines whether earnings are owed to one or more investors (e.g., based on the crowdfunding terms and other criteria, such as a history of remuneration, total revenue, etc. as described elsewhere herein). At 312, in response to a determining that earnings are owed, the crowdfunding module 120 directs the payment processing module 122 to withhold funds for earnings. The earnings may be based on any number of factors, which are included in the crowdfunding terms. In some embodiments, the earnings may be a percentage of each transaction processed for the merchant 102 by the payment processing system 112. For example, the earnings may be based on a percentage of revenue processed for the merchant 102 by the payment processing system 112, a percentage of profit (e.g., as calculated by the payment processing system 112 based on merchant account information 118), a percentage of each transaction linked to utilization of a particular asset (e.g., an asset purchased using the crowdfunding funds), etc. The duration for which the earnings are withheld may be based on a start date, an ending date (e.g., 10% of earnings collected over a calendar year), a total earnings amount (e.g., earnings are collected until a particular amount or percentage has been withheld), a lifespan of an asset (e.g., earnings are collected as long as a certain asset is used), equity ownership, etc.

At 314, the crowdfunding module apportions the repayment and earnings funds to the one or more investors. In some embodiments, investors purchase shares of equity in the business and repayment and earnings may be apportioned according to the number of shares each investor owns. In other embodiments, the crowdfunding terms specify a portion of revenue or profits that are to be returned to investors for a period of time in exchange for the investment and repayment and earnings may be apportioned according to the amount of investment funds provided by each investor. The crowdfunding module 120 may automatically track the total amount of investment funds provided by each investor, divide those funds into the total investment funds (e.g., the approved funding amount, funding goal, or total funds raised) to determine an amount/percentage owed to each investor, and apportion the repayment and/or earnings according that amount/percentage.

At 316, the payment processing system 112 transmits the apportioned funds to the investor(s). The payment processing system 112 can transmit or allocate the appropriate share of transaction funds to the investors, for example, on a per-transaction, daily, weekly, monthly, quarterly, or yearly basis; or only when enough transaction funds have been set aside to repay all investors in full, or only when enough transaction funds have been set aside to pay one or a group of investors in full (e.g., investors may be individually repaid in full on a first-in, first-out basis, etc.). In some instances, allocations for investors for two or more time intervals can be batched into one allocation to reduce transaction costs. For example, if allocations are configured to be paid to investors on a daily basis, then all transactions for the day can be batched into a single daily payment.

In some embodiments, an investor can provide payment receipt information upon acceptance of an offer to invest in a crowdfunding project. For example, the investors can provide their respective bank account routing information to the payment processing system 112 so that the appropriate funds can be deposited in each investor's respective bank account. In some embodiments, the payment processing system 112 may be configured to transfer the earnings to the investor's payment card used to provide crowdfunding funds, save the funds in a designated account on the payment processing system 112, or request additional financial information from the investor.

In some embodiments, the crowdfunding module 120 is configured to send regular correspondence (e.g., e-mails, text messages, etc.) to the investors to provide the investors with a summary of their earnings and/or other information pertaining to the crowdfunding project. In some embodiments, the crowdfunding module 120 may provide data for display to investors via a graphical user interface (e.g., on an application or website usable by a computing device) showing a funding goal, progress, earnings, etc. as described herein. In some embodiments, the crowdfunding module 120 may provide such data for display to investors on subsequent digital receipts transmitted to investors from purchases they make from the merchant who received the crowdfunded investment.

At 318, the payment processing module 122 disburses the remainder of the transaction funds to the merchant. For example, the payment processing module 122 may deposit the funds in the merchant's bank account (e.g., via wire transfer), a merchant account with the payment processing system 112, etc. The deposit can be made each time a POS transaction is processed by the payment processing system 112, periodically, upon the funds reaching a certain amount, etc.

It should be understood that, in some embodiments, an additional fee can be collected by the payment processing system 112 for facilitating the creation and/or operation of the crowdfunding project, calculation of the crowdfunding terms, and/or processing the transactions. This fee, as described elsewhere herein, can be a percentage of the approved funding amount, a percentage of each transaction, a flat fee, etc., and may be deducted from the POS transaction funds.

FIG. 4 is a block diagram of an example process 400 for identifying investors to invest in a crowdfunding project. The process 400 tracks individuals (e.g., customers 104) to determine if they should be targeted as investors in a crowdfunding project. At 402, the crowdfunding module 120 tracks customer attributes including transaction information. The customer attributes may include a frequency and amount of financial transactions entered into by the customer 104 (e.g., financial transactions processed via the payment processing system 112), geographic location of transactions, whether the customer 104 is a business or a consumer, spending potential, whether the customer 104 has invested in other crowdfunding projects, gender, age, occupation, etc. In some embodiments, the crowdfunding module 120 may be able to determine additional information pertaining to the customer 104 (e.g., via third-party data sources, surveys, billing zip code, etc.). The crowdfunding module 120 may store the customer attribute information 124 as described above in reference to FIG. 1. Prior to tracking the customer attributes, the payment processing system 112 (e.g., via the mobile POS terminal) may request permission from a customer 104 to collect information from the customer 104 and/or the customer's interactions with the merchant 102 or the payment processing system 112.

At 403, the merchant initiates a POS transaction with a customer (e.g., via a mobile POS terminal such as merchant device 110). The mobile POS terminal transmits transaction and/or customer information to the payment processing system a part of the POS transaction. At 404, the crowdfunding module 120 determines whether the customer attributes for the POS transaction customer match merchant defined criteria. In some embodiments, a merchant 102 may select an option to allow the crowdfunding module 120 to automatically predict which customers 104 are most likely to become investors (e.g., based on investment offer acceptance rates among similar customers 104 interacting with the payment processing system 112, projections based on customer attribute information, or various computer learning methods) or the merchant 102 may select which customers 104 or customer attributes to target by explicitly defining the criteria.

In some embodiments, the defined criteria may include the frequency with which a customer 104 interacts with the merchant 102. For example, the merchant 102 may only wish to send investment offers to customers 104 who enter into transactions with the merchant 102 more than twice per week. The merchant 102 may select (e.g., via a slider on a graphical user interface displayed on a mobile POS terminal or webpage, for example) the desired transaction frequency, which is automatically tracked (e.g., at 402) by the mobile POS terminal or payment processing system 112.

If the determination at 404 is negative then the merchant application 116 processes the POS with the customer as usual at 406. For example, if a merchant 102 defines that offers should only be sent to customers 104 who purchase from the merchant 102 twice per week, then a customer 104 who only purchases an item from the merchant 102 once per week (e.g., on average, in recent weeks, over the past month, etc.) will not receive an offer to participate in the crowdfunding project and the customer's transaction will be completed as usual (e.g., by the merchant application 116 and the payment processing module 122 as described herein).

If the determination at 404 is positive then the process 400 continues to 408, where an offer (e.g., crowdfunding terms, an investment amount, etc.) is presented (e.g., by the merchant device 110, a computing device, a client device associated with the customer 104 immediately or via a digital receipt, etc.) to the customer 104 to invest in the merchant's crowdfunding project. The offer may be presented to the customer 104 before or after processing the POS transaction for the customer and may include various options and information regarding the crowdfunding project. In some embodiments, the various options and information presented to the customer 104 in the offer include an option to accept, reject, defer, or modify the offer. The information may include, for example, crowdfunding terms, a funding goal amount, a current funding amount, a number of investors, an estimated return on investment, a purpose for which the funding is to be used, a suggested or required investment amount, etc. An example offer and graphical user interface via which the offer may be displayed to a customer 104 are described in further detail below with reference to the example of FIG. 5.

In some embodiments, where contact information is known, the crowdfunding module 120 may send correspondence (e.g., mail, email, text message, etc.) to customers 104 containing an offer to invest in the crowdfunding projects. The correspondence may allow the customers 104 to invest using a web interface or may provide the option to invest the next time the customer 104 enters into a POS transaction with the merchant.

At 410, the POS transaction is completed according to the offer response. If, for example, a customer 104 accepts the offer to fund the crowdfunding project, additional details may be displayed to the customer 104 and the customer 104 may be asked to confirm acceptance. In some embodiments, a customer 104 may choose to automatically contribute to a crowdfunding project each time the customer 104 completes a transaction via the mobile POS terminal, in which instance, additional details and a confirmation request may only be provided the first time the customer 104 accepts the offer and the customer's total investment is automatically tracked by the crowdfunding module 120. Similarly, the customer 104 may have the option to modify his investment, for example, the customer 104 may choose to invest a different amount than the suggested amount.

The customer 104 may select an option to reject the offer, in which case the offer is removed and the transaction is processed without adding funds for the crowdfunding project to the transaction. In some embodiments, the system 100 (e.g., the crowdfunding module 120 and/or the merchant application 116) may present an offer to a customer 104 multiple times. For example, an offer may be presented to the customer 104 once per week for 3 weeks in a row (e.g., with the same or different terms), after which, if the customer 104 rejects the offers, the offer is no longer presented to the customer 104.

In some embodiments, the customer 104 may select the option to defer acceptance or rejection of the offer until a later time. The crowdfunding module 120 may send an e-mail to the customer 104 with more information about the investment opportunity and an option to invest online (e.g., the crowdfunding project may be accessible over the Internet through a Uniform Resource Locator (URL)) or upon the customer's 104 next POS transaction with the merchant 102.

Figure 5A:
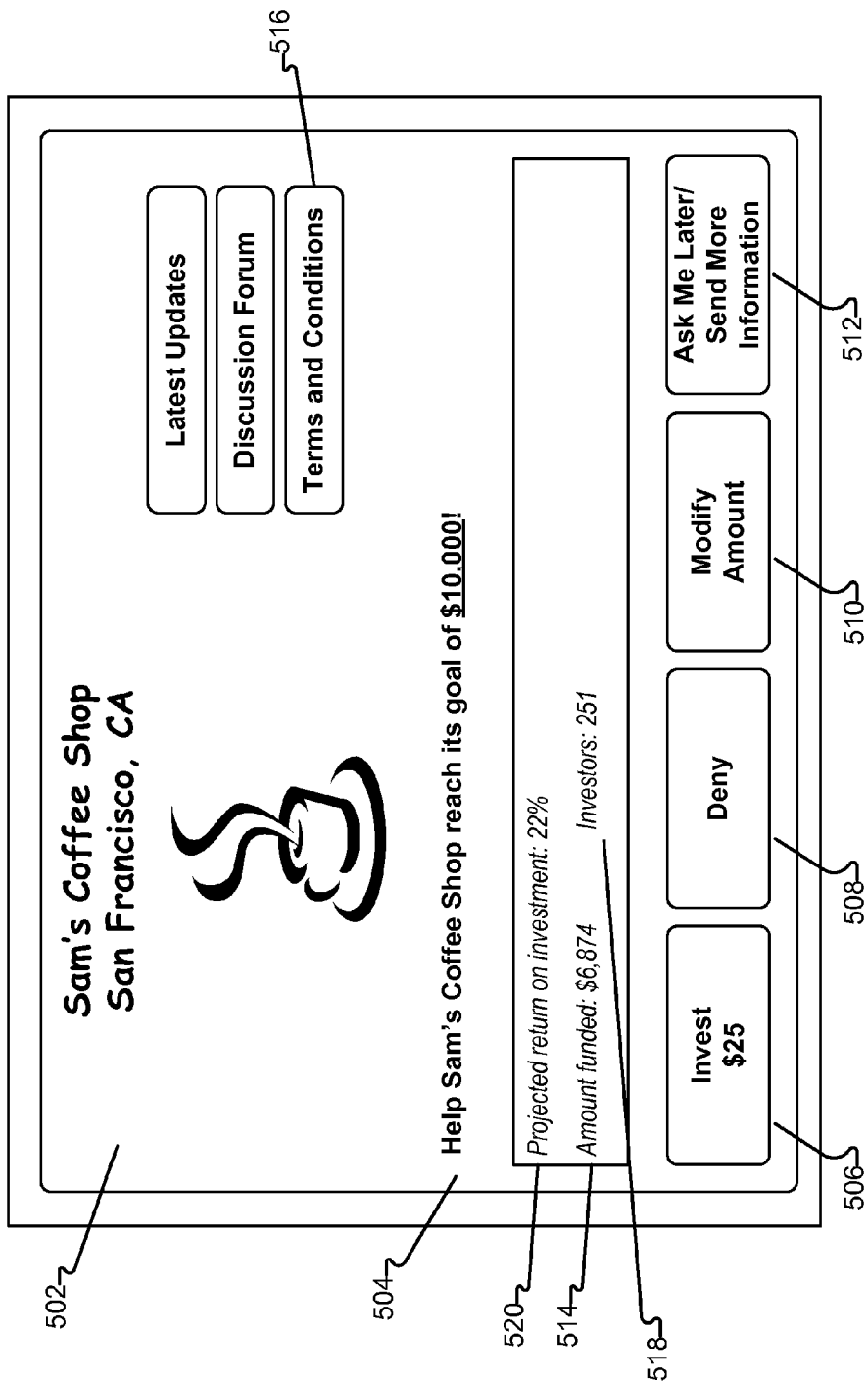
FIG. 5A depicts an example graphical user interface showing details and options to investors regarding a crowdfunding project.

FIG. 5A depicts an example graphical user interface 502 showing details and options for investors regarding a crowdfunding project. The payment processing system 112 or the merchant application 116 may generate data for display on a graphical user interface of a client device with crowdfunding terms (e.g., approved funding amount, repayment terms, current funding amount, etc.). An investor can interact with the interface 502 to learn about and invest in a crowdfunding project. For example, the interface 502 may be presented on a mobile POS terminal (e.g., merchant device 110) to a customer 104.

The interface 502 provides the investor with information about the merchant (e.g., "Sam's Coffee Shop,") that is seeking crowdfunding. This information can include the name and location of the business, together with a business plan that provides, for example, a formal statement of business goals, plans for reaching those goals, and background information about the merchant or team that is seeking funding. The interface 502 also provides details pertaining to the merchant's crowdfunding project including, for example, the total amount of funding being sought 504, the total amount 514 that has been funded by investors so far, the number of investors 518 that have invested in the crowdfunding project, and in some embodiments, a suggested investment amount. The interface 502 may be formatted using logos and themes that are specified by the merchant.

In some embodiments, the interface 502 provides information describing projected returns 520 on investment. For example, the crowdfunding module 120 can determine these projected returns based on evaluating the merchant 102. For example, the crowdfunding module 120 can evaluate the merchant 102 based on the merchant's financial transaction history (e.g., those transactions processed for the merchant 102 by the payment processing system 112). In another example, the crowdfunding module 120 may also be capable of evaluating the merchant 102 based on financial data associated with other businesses that are in a similar category, similar location, or both, as the merchant 102 that is seeking crowdfunding. Such projections can be based on predicted returns on a daily, weekly, monthly, quarterly, or yearly basis.

The investor can also interact with the interface 502 to select an option 516 to review crowdfunding terms, as well as other terms and conditions that define the scope of the financial relationship between the investor and the merchant 102 including, for example, repayment terms, fund terms, approved funding amount, risk, when repayment of profit or revenue will occur and how much of the business's profit or revenue is allocated for repayment. The investor can also interact with the interface 502 to select an option 506 to invest in the crowdfunding project through the payment processing system 112, deny 508 the offer to invest, modify the amount that the investor wants to invest 510, and defer the decision to invest until a later date and/or request more information about the crowdfunding project 512.

Figure 5B:
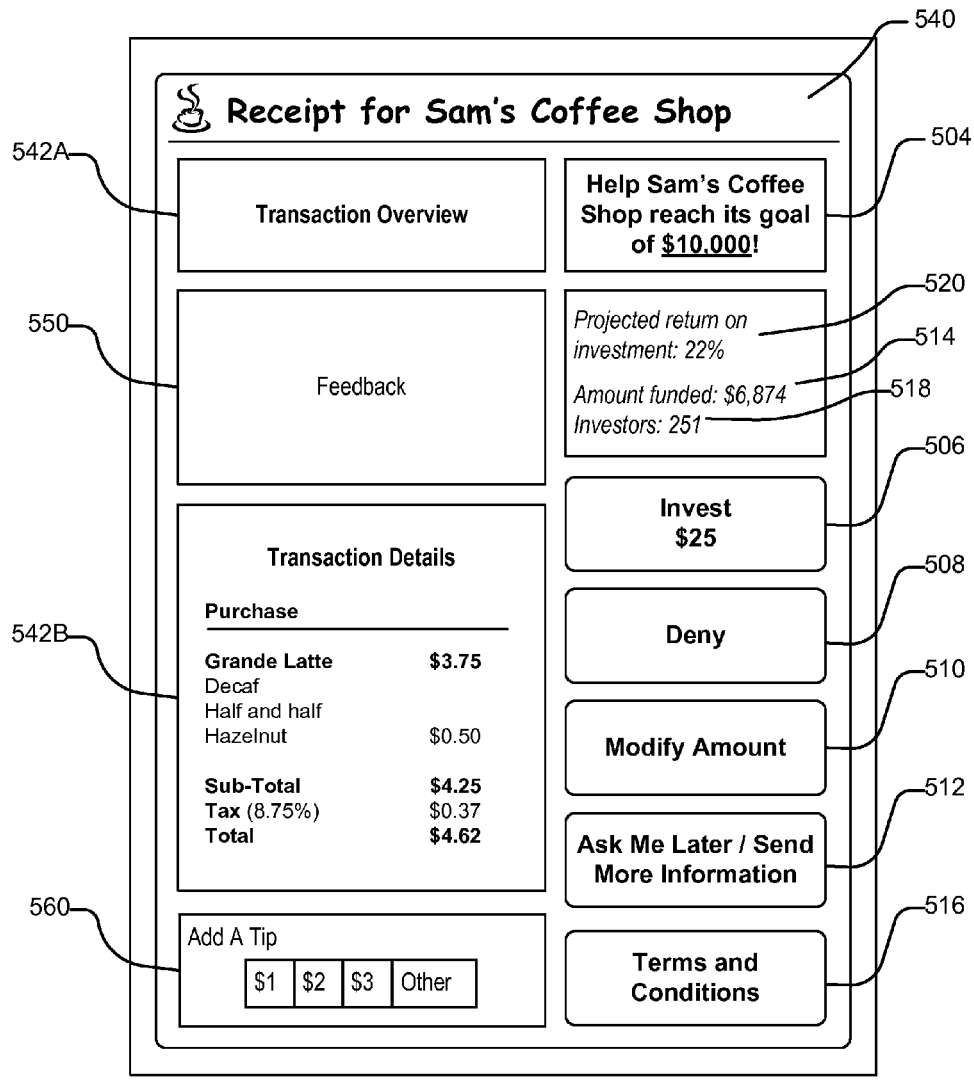
FIG. 5B depicts an example graphical user interface showing a digital receipt with options for investors regarding a crowdfunding project.

FIG. 5B depicts an example graphical user interface 540 showing an interactive digital receipt with options for investors regarding a crowdfunding project. For example, the receipt may be emailed to the customer or received via text message and viewed on a mobile or other computing device. In the example of FIG. 5B, the interactive digital receipt includes transaction components 542A and 542B, an interactive feedback component 550, an interactive tipping component 560, and interactive crowdfunding options as described above with reference to FIG. 5A.

Transaction components 542A and 542B provide transaction information associated with the transaction. Transaction component 542A includes an overview of the transaction completed between the customer and the merchant, such as the total amount of the transaction, the payment card used for the transaction (e.g., card name or last four digits of a payment card), the date, or the like. Transaction component 542B includes details of the transaction, such as the name of the items purchased, the quantity, the price, or the like.

Interactive tipping component 560 allows the customer to submit a gratuity or tip amount, at a later time, for example, subsequent to completion of a financial transaction. As depicted in the example of FIG. 5B, the transaction may be payment for a cup of coffee, where the customer can leave a tip after she has left the restaurant using the interactive digital receipt 540 which has been delivered to her computing device automatically after completion of the transaction. In some embodiments, the payment processing system 112 receives the customer's tip submission via interactive receipt 540. The payment processing module 122 adds the tip amount to the already authorized payment amount and sends the updated authorization to the merchant device 110 of the merchant, without requiring any additional payment approval from the customer. The merchant does not have to physically enter and request for an additional authorization for the tip amount from the payment processing system 112.

In some embodiments, tipping component 560 includes automatically generated tip amounts based on a payment amount associated with the transaction (e.g., 10%, 15%, or 20%). In some embodiments, tipping component 560 includes an input function that allows the customer to enter a tip amount. In some embodiments, where interactive digital receipt 540 is in the form of a text message, tipping component 560 may be embodied in the text message prompting the customer to reply with a tip amount (e.g., "Tip by replying to this message with a tip amount"). In some embodiments, tipping component 560 is a Uniform Resource Locator (URL) link which takes the user to a web page to allow adding of the tip amount. The link can be a part of a text message, a part of the text box within a mobile app, or an email.

In some embodiments, tipping component 560 is configured to be available for a predefined time period, or timeframe, starting after a time instance when payment has been authorized and approved. The time period may be, for example, an hour, a day, a week, or any other desired time period (e.g., unlimited). In some embodiments, the time period is configured by the merchant. At the expiration of the time period, the tipping feature becomes unavailable. In a real-world setting, such time limitation helps the merchant manage its financial transactions more efficiently. For example, a merchant often processes its financial transactions in batches and would not want to keep any particular transaction open indefinitely.

In some embodiments, the time period of the tipping component 560 is configured to incorporate a user defined default tip amount. A customer defines a nominal tip to be automatically submitted if no tip is submitted at the time period expiration. For example, the customer may define the default tip to be $10 for her favorite restaurant to make sure that the merchant always gets a tip. In this example, the $10 tip is automatically authorized for any transaction with that restaurant whenever no tip amount is added at the expiration of the interactive tipping component 560. In some embodiments, the default tip amount may be defined by the merchant. For example, a restaurant merchant may want to configure a default nominal amount for restaurant services to groups of six parties or more. In such example, when no tip is added to the payment amount at the end of a time period (e.g., 2 hours), an automatic 20% tip is added to the customer's payment card authorization.

Interactive feedback component 550 allows the customer to submit feedback after the completion of a particular transaction with a merchant. The feedback may include, for example, a rating (e.g., 5 stars), a review, a suggestion, or the like, on various aspects of the transaction (e.g., store cleanliness, service, products, overall visit satisfaction, etc.). In some embodiments, the feedback is submitted directly to the merchant. In other embodiments, a digital receipt system coordinates, communicates, and links with third party services associated with the merchant in implementing the feedback feature. In such embodiments, the digital receipt system transmits the feedback, submitted by the customer via receipt 540, to the third party services. The third party services aggregate the feedback in association with other feedback provided by the merchant. Such third party services may include, for example, Yelp.com, Urban Spoon, YP.com, and the like.

In some embodiments, feedback component 550 is configured to be available only for a predefined time period, or timeframe. In some embodiments, the time period associated with the feedback component 550 is configured to be the same as the time period associated with tipping component 560. For example, the time periods for both may be set at one hour and at the expiration of the hour, both the tipping and the feedback features become unavailable. In some embodiments, the feedback time period is configured to be different from the tipping time period. For example, the feedback time period may be set at one week while the tipping time period may be set at one hour.

In some embodiments, the feedback time period is configured differently depending on a particular merchant. In some embodiments, a merchant can configure the feedback time period to be tied to an incentive to encourage feedback. For example, the customer is rewarded a "20% Off Coupon" incentive if a written review is submitted before expiration of the feedback time period. In another example, if the feedback is submitted within 10 minutes after the completion of the payment transaction, the incentive is a 20% Off coupon; on the other hand, if the feedback is submitted within 12 hours, but not exceeding the transaction time period allowed for the feedback (e.g., 24 hours), the incentive is a 5% coupon.

The interactive digital receipt 540 may also provide details pertaining to the merchant's crowdfunding project including, for example, the total amount of funding being sought 504, the total amount 514 that has been funded by investors so far, the number of investors 518 that have invested in the crowdfunding project, and in some embodiments, a projected return on investment 520. Similar to the example of FIG. 5A, the interactive digital receipt 540 allows the investor to select an option 516 to review crowdfunding terms, as well as other terms and conditions that define the scope of the financial relationship between the investor and the merchant 102 including, for example, repayment terms, fund terms, approved funding amount, risk, when repayment of profit or revenue will occur, and how much of the business's profit or revenue is allocated for repayment. The investor can also interact with the digital receipt 540 to select an option 506 to invest in the crowdfunding project through the payment processing system 112, deny 508 the offer to invest, modify the amount that the investor wants to invest 510, and defer the decision to invest until a later date and/or request more information about the crowdfunding project 512.

Figure 6:
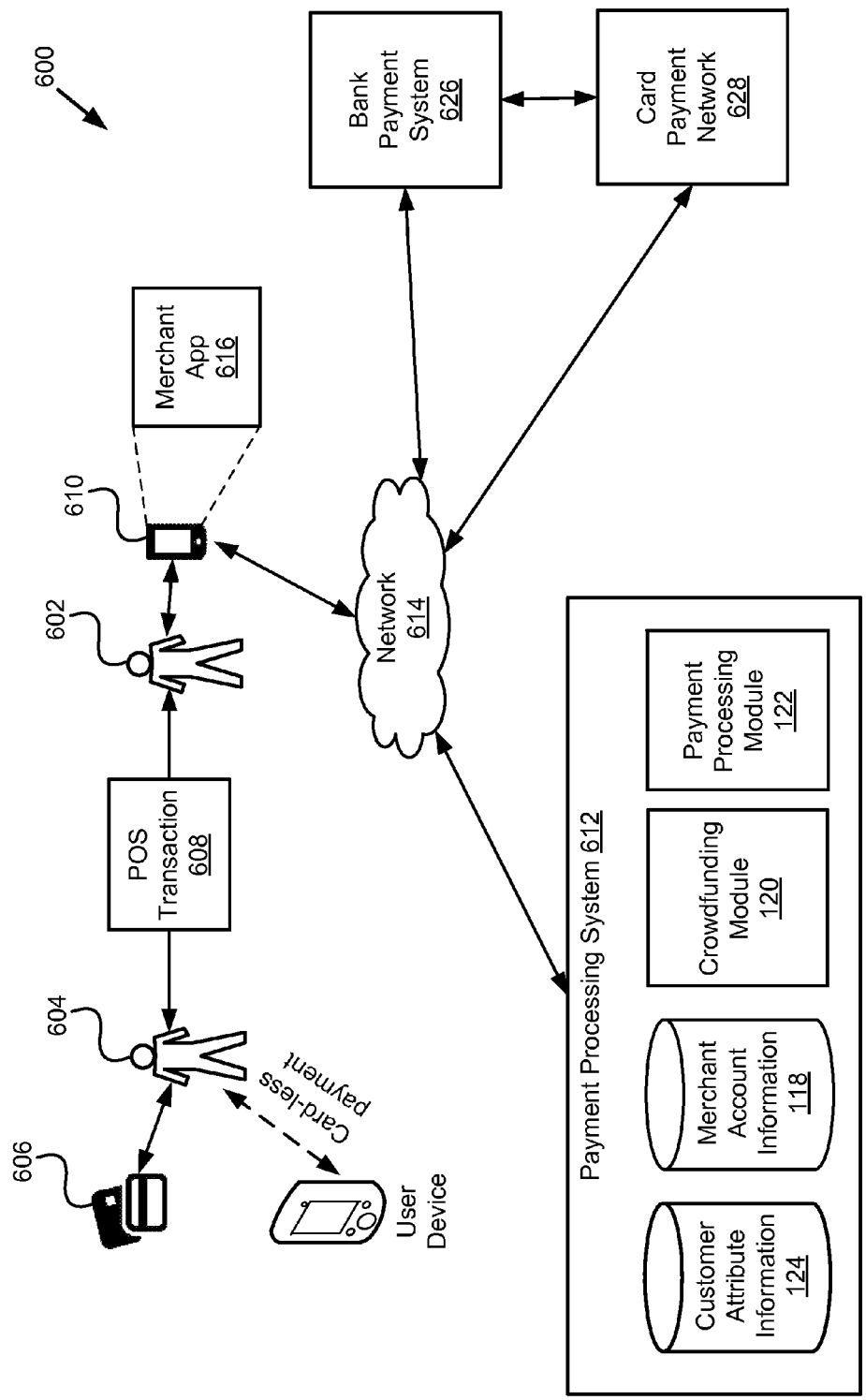
FIG. 6 illustrates an example architecture of a payment communication system for enabling transactions between merchants and customers.

FIG. 6 illustrates an example architecture of a payment communication system 600 for enabling transactions between merchants 602 and customers 604. In the example of FIG. 6, a customer 604 may use any of a variety of payment cards 606 when participating in a POS transaction 608 with a merchant 602. For example, a customer 604 may typically have payment cards 606 such as credit cards, debit cards, prepaid cards, and the like, that the customer 604 may use for conducting POS transaction 608. In some embodiments, the payment cards 606 may include one or more magnetic strips for providing payment card and customer information when swiped in a card reader 830 (depicted in FIG. 8). In other embodiments, other types of payment cards may be used, for example smart cards having a built in integrated circuit including a memory chip, a radio frequency identification tag, and the like. Although, in this description, financial transactions are generally described as involving payment cards, swiping payment cards, payment card readers, payment card information, etc., in some embodiments, the payment communication system 100 is configured to accept other payment instruments, such as card-less payments, from customers 604. For example, a customer may be associated with a computing device that is configured to communicate with the POS terminal. The computing device (e.g., a smart phone or other device) may store a virtual payment card, or other payment means, that may be communicated to the POS terminal for payment, for example, via near field communication, Bluetooth low-energy (BLE), or other suitable means as a card-less payment.

The payment communication system 600 in the example of FIG. 6 illustrates a merchant device 610 associated with the merchant 602 that participates in the payment processing service provided by the service provider of the payment processing system 612. As discussed elsewhere herein, the merchant device 610 may be a computing device (e.g., a mobile computing device) able to communicate with the payment processing system 612, and with various other computing devices, through any suitable communication protocols, interfaces, and networks, including network 614. Further, the merchant device 610 may be any appropriate device operable to send and receive requests, messages, or other types of information over the network 614. Additionally, while only a single merchant device 610 is illustrated in the example of FIG. 6, in some embodiments there may be additional merchant devices depending on the number of merchants participating in the payment service.

Each merchant device 610 may include an instance of a merchant application 616 executed on the merchant device. For example, the merchant application 616 may be a register application. The merchant application 616 may provide POS functionality to enable the merchant 602 to accept payments at a POS location using the merchant device 610 as a mobile POS terminal. In some types of businesses, the POS location may correspond to a store or other place of business of the merchant, and thus, may be a fixed location that typically does not change on a day-to-day basis. In other types of businesses, however, the POS location may change from time to time, such as in the case that the merchant 602 operates a food truck, is a street vendor, a cab driver, or has an otherwise mobile business (e.g., in the case of merchants who sell items at customers' homes, customers' places of business, and so forth).

Accordingly, the merchant 602 and the customer 604 may conduct a POS transaction 608 by which the customer 604 acquires an item or service from the merchant 602 at a POS location. The merchant application 616 on the merchant device 610 may send transaction information to the payment processing system 612 (e.g., as the transaction is being conducted at the POS location). In some embodiments, such as if a particular merchant device 610 is not connected to the network 614 and is therefore processing transactions offline, the transaction information may be sent in a batch at a subsequent point in time or using other suitable techniques. In some embodiments, the transaction information may be sent via SMS, MMS, or a voice call.

The transaction information may include information regarding the time, place, and the amount of each respective transaction, information related to the item acquired, payment card information, as well as additional information, such as customer information. For instance, the transaction information can include data stored in the payment card, such as magnetic stripe or integrated circuit data (e.g., cardholder name, card number, and other card information). In addition, when completing the transaction a customer may sometimes provide a receipt email address or phone number for receiving a receipt through email or text message, respectively. Other examples of transaction information that can be captured include detailed item information (e.g., an itemized listing of the items or services being acquired), the price being paid for each item or service, descriptors of the items or services (e.g., size, flavor, color, etc.), geolocation data indicating a geographic POS location of a particular transaction, online/offline card data, data describing the merchant (e.g., a merchant identifier, a merchant category code (MCC), any type of data that is received upon a customer's authentication into a social network, if any), and various other types of information.

To accept electronic payments for POS transactions, the merchant 602 typically creates a merchant account on the payment processing system 612 by providing information describing the merchant including, for example, merchant name, contact information (e.g., telephone numbers, the merchant's address, and one or more financial accounts to which funds collected from customers will be deposited). This merchant information can be securely stored by the service provider, for example, as merchant account information 118 in a secure database. Further, the merchant information may include a merchant profile created for each merchant. The merchant profile may include information about the merchant 602 and transaction information associated with transactions conducted by the merchant.

The payment processing system 612 enables a service provider to provide a payment service in which merchants 602 are able to conduct POS transactions 608 with a plurality of customers 604, such as for selling services and/or products to the customers 604. The payment processing system 612 may include one or more servers that are configured to process secure electronic financial transactions (e.g., payment during a POS transaction 608) by communicating with the merchant device 610, card payment networks 628, and bank or other financial institution payment systems 624. The payment processing system 612 includes a payment processing module 122 that receives transaction information for processing payments made through the merchant application 616. For example, the payment processing module 122 may receive transaction information, such as an amount of the transaction, and may verify that a particular payment card 606 can be used to pay for the transaction, such as by contacting a card clearinghouse of a card payment network 628. Furthermore, in some examples, the payment processing module 122 may redirect payment information for transactions to be made using payment cards 606 to a bank, or other financial institution, payment system 626. In other embodiments, the merchant device 610 may communicate directly with an appropriate card payment network 628 or bank payment system 626 for approving or denying a transaction using a particular payment card 606 for a POS transaction 608. Additional details of payment processing are discussed below.

As introduced above, the payment processing system 612 may be configured to communicate with one or more systems of a card payment network 628 (e.g., MasterCard®, VISA®, or the like) over the network 614 to conduct financial transactions electronically. The payment processing system 612 may also communicate with one or more bank payment systems 626 of one or more banks over the network 614. For example, the payment processing system 612 may communicate with an acquiring bank, a payment card issuing bank, and/or a bank maintaining customer accounts for electronic payments.

A payment card acquiring bank may be a registered member of a card association (e.g., Visa®, MasterCard®, or the like), and may be part of a card payment network 628. A payment card issuing bank may issue payment cards 606 to customers 604, and may pay acquiring banks for purchases made by cardholders to which the issuing bank has issued a payment card 606. Accordingly, in some embodiments, the systems of an acquiring bank may be included in the card payment network 628 and may communicate with systems of a payment card issuing bank to obtain payment. Further, in some embodiments, bank payment systems 626 may include systems associated with debit card issuing institutions, in which case, the systems of the debit card issuing institution may receive communications regarding a transaction in which the customer uses a debit card instead of a credit card. Additionally, there may be systems of other financial institutions involved in some types of transactions or in alternative system architectures, and thus, the foregoing are merely several examples.

The network 614 can be a conventional type, wired or wireless, and may have numerous different configurations including a star configuration, token ring configuration, or other configurations. Furthermore, the network 614 may include a local area network (LAN), a wide area network (WAN) (e.g., the internet), and/or other interconnected data paths across which multiple devices may communicate. In some embodiments, the network 614 may be a peer-to-peer network. The network 614 may also be coupled with or include portions of a telecommunications network for sending data using a variety of different communication protocols. In some embodiments, the network 614 may include Bluetooth (or Bluetooth low energy) communication networks or a cellular communications network for sending and receiving data including via short messaging service (SMS), multimedia messaging service (MMS), hypertext transfer protocol (HTTP), direct data connection, WAP, email, etc. Although the example of FIG. 4 illustrates one network 614 coupled to the merchant device, payment processing system, card payment network, and bank, in practice one or more networks 614 can connect these entities.

Figure 7:
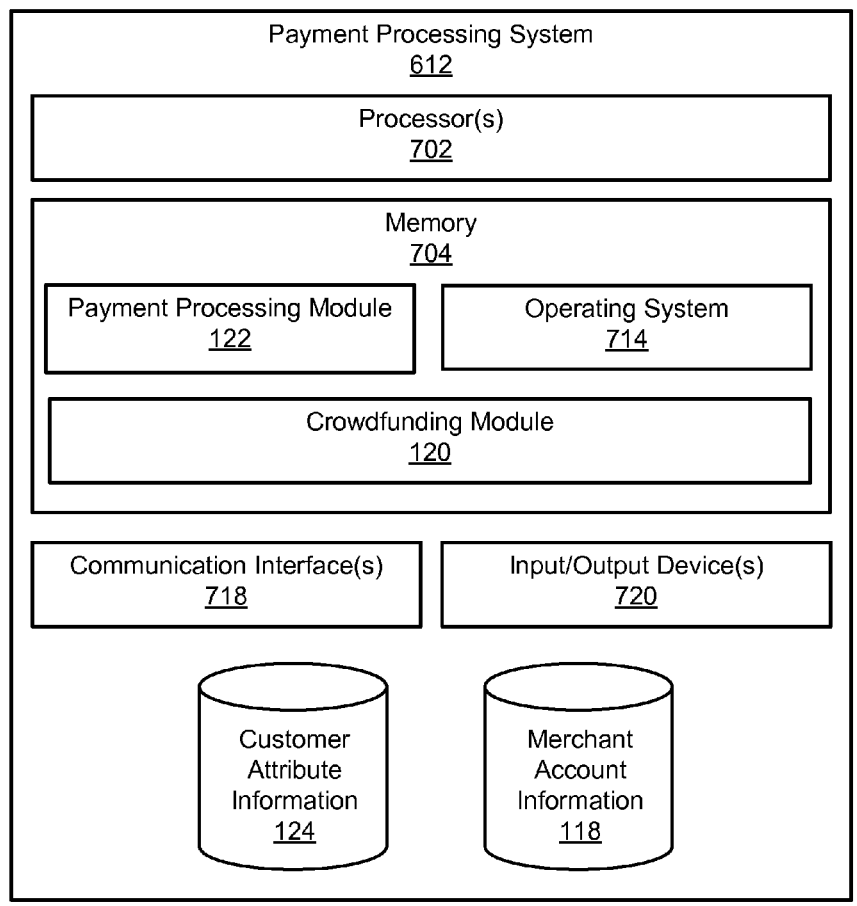
FIG. 7 is a block diagram illustrating select components of an example embodiment of a payment processing system.

FIG. 7 is a block diagram 700 illustrating select components of an example payment processing system 612 according to some embodiments. The payment processing system 612 may be any suitable type of computing device capable of sending communications and performing the functions according to the techniques described herein and may be operated by a service provider that provides the payment processing service. For instance, in the case of a server, the modules, other functional components, and data may be implemented on a single server, a cluster of servers, a server farm or data center, a cloud-hosted computing service, a cloud-hosted storage service, and so forth, although other computer architectures may additionally or alternatively be used.

Further, while the examples herein illustrate the components and data of the payment processing system 612 as being present in a single location, these components and data may alternatively be distributed across different computing devices and different locations. Consequently, the functions may be implemented by one or more computing devices, with the various functionality described above distributed in various ways across the different computing devices, to collectively implement the payment processing system 612. Multiple payment processing systems 612 may be located together or separately, and organized, for example, as virtual servers, server banks and/or server farms. The described functionality may be provided by the servers of a single entity or enterprise, or may be provided by the servers and/or services of multiple different customers or enterprises.

In the example of FIG. 7, the payment processing system 612 includes one or more processors 702, one or more memory devices 704, one or more communication interfaces 718, and one or more input/output devices 720. These components may be similar to those described elsewhere herein.

The memory 704 may be used to store and maintain any number of functional components or modules that are executable by the processor 702. In some embodiments, these functional components comprise instructions or programs that are executable by the processor 702 and that, when executed, implement operational logic for performing the actions and services attributed above to the payment processing system 612. Functional components of the payment processing system 612 stored in the memory 704 may include the payment processing module 122, the crowdfunding module 120, and the operating system 714. These components may be similar to those described elsewhere herein. In addition, the memory 704 may store data used for performing the operations described herein. Thus, the memory 704 may store merchant information 118, including merchant profiles, and customer attribute information 124 as discussed above. Further, the payment processing system 612 may include many other logical, programmatic and physical components, of which those described above are merely examples that are related to the discussion herein.

Figure 8:
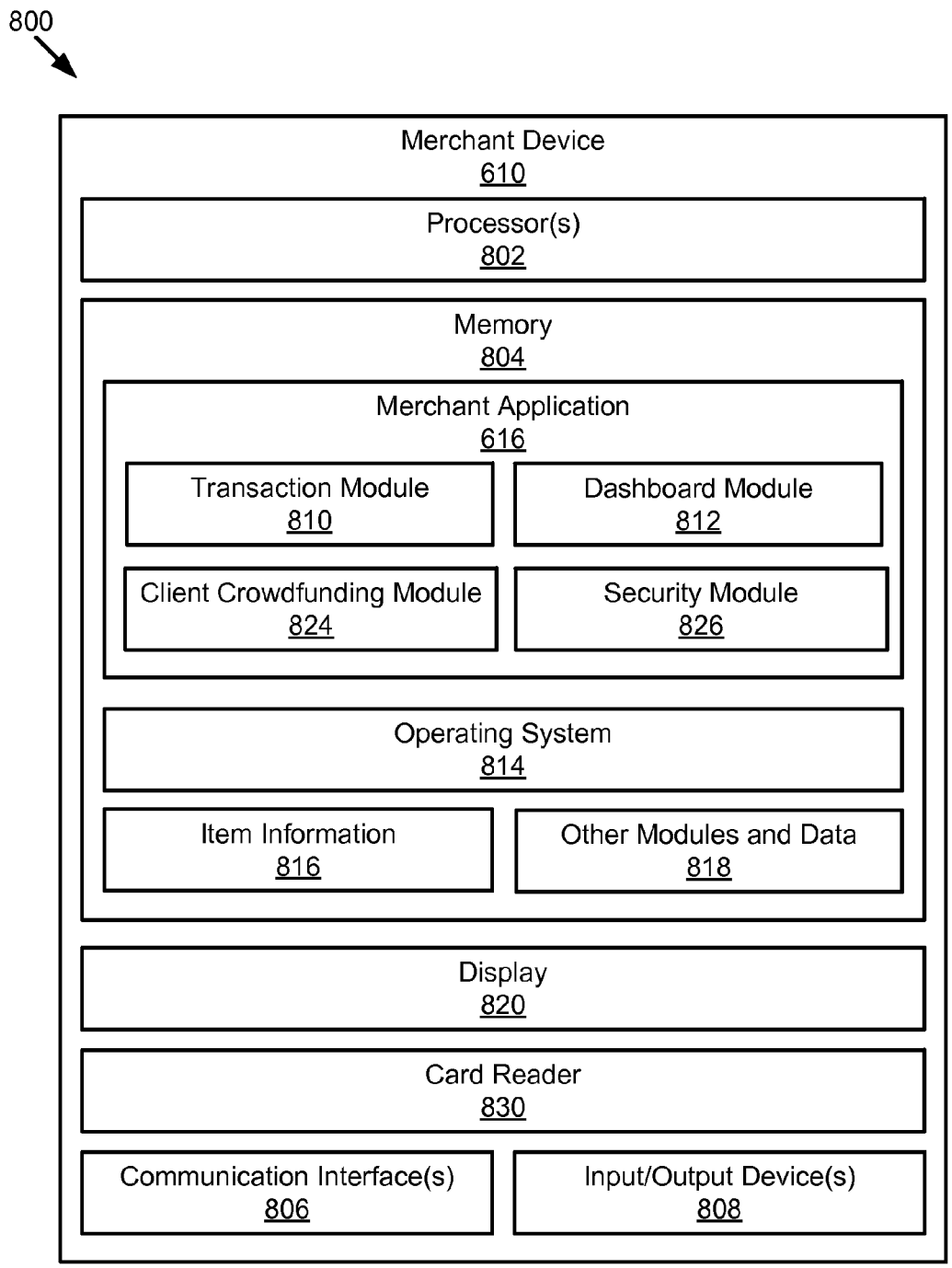
FIG. 8 is a block diagram illustrating select components of an example embodiment of a merchant device.

FIG. 8 is a block diagram 800 illustrating select components of an example merchant device 610 according to some embodiments. The merchant device 610 may be a POS terminal or be part of a POS terminal (e.g., a mobile POS terminal as described herein). The merchant device 610 may be any suitable type of computing device (e.g., portable, semi-portable, semi-stationary, or stationary). Some examples of the merchant device 610 may include tablet computing devices; smart phones and mobile communication devices; laptops, netbooks and other portable computers or semi-portable computers; desktop computing devices; terminal computing devices and other semi-stationary or stationary computing devices; dedicated register devices; wearable computing devices, or other body mounted computing devices; augmented reality devices; or other computing devices capable of sending communications and performing the functions according to the techniques described herein.

In the example of FIG. 8, the merchant device 610 includes at least one processor 802, a memory 804, one or more communication interfaces 806, and one or more input/output (I/O) devices 808. Each processor 802 may itself comprise one or more processors or processing cores. For example, the processor 802 can be implemented as one or more microprocessors, microcomputers, microcontrollers, digital signal processors, central processing units, state machines, logic circuitries, and/or any devices that manipulate signals based on operational instructions. In some embodiments, the processor 802 may be one or more hardware processors and/or logic circuits of any suitable type specifically programmed or configured to execute the algorithms and processes described herein by performing various input/output, logical, and/or mathematical operations. The processor 802 can be configured to fetch and execute computer-readable processor-executable instructions stored in the memory 804.

Depending on the configuration of the merchant device 610, the memory 804 may be an example of tangible non-transitory computer storage media (e.g., computer-readable media) and may include volatile and nonvolatile memory and/or removable and non-removable media implemented in any type of technology for storage of information such as computer-readable processor-executable instructions, data structures, program modules or other data. The computer-readable media may include, but is not limited to, RAM, ROM, EEPROM, flash memory, solid-state storage, magnetic disk storage, optical storage, and/or other computer-readable media technology. Further, in some cases, the merchant device 610 may access external storage, such as RAID storage systems, storage arrays, network attached storage, storage area networks, cloud storage, or any other medium that can be used to store information and that can be accessed by the processor 802 directly or through another computing device or network. Accordingly, the memory 804 may be computer storage media able to store instructions, modules or components that may be executed by the processor 802.

The memory 804 may be used to store and maintain any number of functional components or modules that are executable by the processor 802. In some embodiments, these functional components comprise instructions or programs that are executable by the processor 802 and that, when executed, implement operational logic for performing the actions and services attributed above to the merchant device 610. Functional components of the merchant device 610 stored in the memory 804 may include the merchant application 616. In this example, the merchant application 616 includes a transaction module 810, a dashboard module 812, and a security module 826. The transaction module 810, for example, presents an interface, such as a payment interface to enable the merchant to conduct transactions, receive payments, extend offers for participating in and receive payment toward a crowdfunding project, and so forth, as well as for communicating with the payment processing system 612 for processing payments and sending transaction information. The dashboard module 812 enables the merchant to manage the merchant's account, the merchant profile, merchant preferences, view saved or new pricing information, communicate with the payment processing system 612 regarding crowdfunding projects, and the like. The security module 826 may, as described herein, enable the merchant application 616 to encrypt and decrypt transaction information communicated between the merchant device 610 and other system components. Additional functional components may include an operating system 814 for controlling and managing various functions of the merchant device 610 and for enabling basic user interactions with the merchant device 610.

In addition, the memory 804 may also store data, data structures and the like, that are used by the functional components. For example, data stored by the memory 804 may include item information 816 that includes information about the items offered by the merchant, which may include a list of items currently available from the merchant, images of the items, descriptions of the items, prices of the items, and so forth. For instance, when the merchant 602 is setting up the merchant application 616 to accept payments for particular items offered by the merchant 602, the merchant may enter the item information 816 for the particular items. Depending on the type of the merchant device 610, the memory 804 may also optionally include other functional components and data, such as other modules and data 818, which may include programs, drivers, etc., and the data used or generated by the functional components. Further, the merchant device 610 may include many other logical, programmatic and physical components, of which those described are merely examples that are related to the discussion herein.

The communication interface(s) 806 may include one or more interfaces and hardware components for enabling communication with various other devices, such as over the network(s) 614 or directly. For example, communication interface(s) 806 may enable communication through one or more of the internet, cable networks, wireless networks (e.g., Wi-Fi) and wired networks, as well as close-range communications such as Bluetooth®, Bluetooth® low energy, and the like, as additionally enumerated elsewhere herein.

In another embodiment, the communication interface(s) 806 may include a cellular communications transceiver for sending and receiving data over a cellular communications network such as via voice call, short messaging service (SMS), multimedia messaging service (MMS), hypertext transfer protocol (HTTP), direct data connection, WAP, e-mail or another suitable type of electronic communication. The communication interface(s) 806 also provides other conventional connections to the network 614 for distribution of files and/or media objects using standard network protocols such as TCP/IP, HTTP, HTTPS and SMTP as will be understood.

The merchant device 610 may further include a display 820, which may employ any suitable display technology. For example, the display 820 may be a liquid crystal display, a plasma display, a light emitting diode display, an OLED (organic light-emitting diode) display, an electronic paper display, or any other suitable type of display able to present digital content thereon. In some embodiments, the display 820 may have a touch sensor associated with the display 820 to provide a touchscreen display configured to receive touch inputs for enabling interaction with a graphical user interface presented on the display 820. Accordingly, embodiments described herein are not limited to any particular display technology. Alternatively, in some embodiments, the merchant device 610 may not include the display 820, and information may be presented by other means, such as aurally.

The merchant device 610 may further include one or more I/O devices 808. The I/O devices 808 may include speakers, a microphone, a camera, and various user controls (e.g., buttons, a joystick, a keyboard, a keypad, etc.), a haptic output device, and so forth.

In addition, the merchant device 610 may include or may be connectable to a payment card reader 830. In some embodiments, the payment card reader 830 may plug in to a port in the merchant device, such as a microphone/headphone port, a data port, or other suitable port. The payment card reader 830 may include a card interface for reading a magnetic stripe or an integrated circuit of a payment card 606, and further may include encryption technology for encrypting the information read from the payment card 606. Alternatively, numerous other types of payment card readers 830 may be employed with the merchant devices 610 herein, depending on the type and configuration of the merchant device 610.

As used here, the term "payment card" refers to a payment mechanism which includes a debit card, a conventional credit card, "smartcards" that have embedded integrated circuit chips (e.g., Europay-MasterCard-Visa (EMV) cards), contactless payment (e.g., near field communications), or any wallet-size card which functions as a combination of any of these payment mechanisms. In some embodiments, payment card may also include a virtual payment card stored on a device such as a smart phone or other device and transmittable, for example, via near field communication or other suitable means.

Other components included in the merchant device 610 may include various types of sensors (not shown), which may include a GPS device, an accelerometer, gyroscope, compass, proximity sensor, and the like. Additionally, the merchant device 610 may include various other components that are not shown, examples of which include removable storage, a power source, such as a battery and power control unit, and so forth.

In the above description various features, functionality, and operations are described as pertaining to a specific component of the system 100 and/or 600, but it should be understood that the features, functionality, and operations can be performed by different components, distributed among components, etc. For example, various operations of the crowdfunding module 120, the payment processing module 122, and the merchant account information 118 may be performed by the merchant application 116 and/or 616. Similarly, operations of the merchant application may be performed by the payment processing system 112 and/or 612.

A payment communication system using a payment card reader has been described. In the above description, for purposes of explanation, numerous specific details are set forth in order to provide a thorough understanding of the techniques introduced herein. It will be apparent, however, to one skilled in the art that the techniques can be practiced without these specific details. In other instances, structures and devices are shown in block diagram form in order to avoid obscuring the description and for ease of understanding. For example, the techniques are described in one embodiment above primarily with reference to software and particular hardware. However, the techniques may be implemented using any type of computing system that can receive data and commands, and present information as part of any peripheral device providing services.

Reference in the specification to "one embodiment" or "an embodiment" means that a particular feature, structure, or characteristic described in connection with the embodiment is included in at least one embodiment of the description. The appearances of the phrase "in one embodiment" in various places in the specification are not necessarily all referring to the same embodiment.

Some portions of the detailed descriptions described above are presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared and otherwise manipulated. It has proven convenient at times, principally for reasons of common usage, to refer to these signals as bits, values, elements, symbols, characters, terms, numbers or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "processing" or "computing" or "calculating" or "determining" or "displaying" or the like, refer to the action and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

The present specification also relates to an apparatus for performing the operations herein. This apparatus may be specially constructed for the required purposes, or it may comprise a general-purpose computer selectively activated or reconfigured by a computer program stored in the computer. Such a computer program may be stored in a computer readable storage medium, such as, but is not limited to, any type of disk including floppy disks, optical disks, CD-ROMs, and magnetic disks, read-only memories (ROMs), random access memories (RAMs), EPROMs, EEPROMs, magnetic or optical cards, flash memories including USB keys with non-volatile memory or any type of media suitable for storing electronic instructions, each coupled to a computer system bus.

The specification can take the form of an entirely hardware embodiment, an entirely software embodiment or an embodiment containing both hardware and software elements. In one embodiment, the specification is implemented in software, which includes but is not limited to firmware, resident software, microcode, etc.

Furthermore, the description can take the form of a computer program product accessible from a computer-usable or computer-readable medium providing program code for use by or in connection with a computer or any instruction execution system. For the purposes of this description, a computer-usable or computer readable medium can be any apparatus that can contain, store, communicate, propagate, or transport the program for use by or in connection with the instruction execution system, apparatus, or device.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

Finally, the algorithms and displays presented herein are not inherently related to any particular computer or other apparatus. Various general-purpose systems may be used with programs in accordance with the teachings herein, or it may prove convenient to construct more specialized apparatus to perform the required method steps. The required structure for a variety of these systems will appear from the description below. In addition, the specification is not described with reference to any particular programming language. It will be appreciated that a variety of programming languages may be used to implement the teachings of the specification as described herein.

The foregoing description of the embodiments has been presented for the purposes of illustration and description. It is not intended to be exhaustive or to limit the techniques to the precise form disclosed. Many modifications and variations are possible in light of the above teaching. It is intended that the scope of the embodiments be limited not by this detailed description, but rather by the claims of this application. As will be understood by those familiar with the art, the examples described herein may be embodied in other specific forms without departing from the spirit or essential characteristics thereof. Likewise, the particular naming and division of the modules, routines, features, attributes, methodologies and other aspects are not mandatory or significant, and the mechanisms that implement the techniques or features may have different names, divisions and/or formats. Furthermore, as will be apparent to one of ordinary skill in the relevant art, the modules, routines, features, attributes, methodologies and other aspects of the techniques can be implemented as software, hardware, firmware or any combination of the three. Also, wherever a component, an example of which is a module, is implemented as software, the component can be implemented as a standalone program, as part of a larger program, as a plurality of separate programs, as a statically or dynamically linked library, as a kernel loadable module, as a device driver, known to those of ordinary skill in the art of computer programming. Additionally, the techniques are in no way limited to embodiment in any specific programming language, or for any specific operating system or environment. Accordingly, the specification is intended to be illustrative, but not limiting, of the scope of the claims, which are set forth below.

What is claimed is:

1. A computer-implemented method comprising:
   receiving, by a payment processing system, from a mobile computing device associated with a merchant, transaction information for a plurality of transactions conducted between the merchant and a plurality of customers, wherein the mobile computing device has a register application installed thereon, which, when executed, configures the mobile computing device as a point-of-sale (POS) terminal to receive an input indicating a product or service for purchase by an individual customer, the register application further configuring the POS terminal to receive payment card information from a payment card reader coupled with the mobile computing device to enable a transfer of funds from the individual customer to the merchant, the register application further configuring the POS terminal to communicate corresponding transaction information over a network to the payment processing system;
   generating, by the payment processing system, a data structure including attribute information of the plurality of customers of the merchant, wherein the attribute information is determined, at least partially, from aggregated transaction information received from the POS terminal of the merchant;
   receiving, by the payment processing system, from the register application on the POS terminal, a request from the merchant to establish a crowdfunding project, the request including an amount of funding requested and one or more defined criteria for potential investors;
   calculating, by the payment processing system, crowdfunding terms based on the amount of funding requested and a transaction history for the merchant, the crowdfunding terms including an approved funding amount, and repayment terms providing for repayment of the approved funding amount plus earnings to one or more investors, the repayment terms including a portion of each transaction processed for the merchant by the payment processing system to withhold for repayment of the approved funding amount plus earnings to the one or more investors;
   receiving, by the payment processing system, from the register application on the POS terminal, a request to process a financial payment transaction conducted between the merchant and a first customer of the plurality of customers using the POS terminal;
   accessing, by the payment processing system, the data structure to determine attributes of the first customer for determining that the first customer is a potential investor based on comparing the determined attributes of the first customer with the one or more defined criteria from the merchant;

in response to determining, by the payment processing system, that the first customer is a potential investor, sending crowdfunding information to the POS terminal to cause the register application to configure the POS terminal to present on a display associated with the POS terminal an offer for enabling the first customer to invest in the crowdfunding project, the offer including crowdfunding terms and an investment amount;

receiving, by the payment processing system, an acceptance of the offer including the crowdfunding terms, wherein the register application configures the POS terminal to receive the acceptance from the first customer and send the acceptance to the payment processing system;

processing, by the payment processing system, payment card information from the first customer to fund the investment amount, wherein the register application configures the POS terminal to receive the payment card information from the card reader and send the payment card information to the payment processing system;

withholding, by the payment processing system, the portion of each transaction processed via the POS terminal for the merchant by the payment processing system for repayment of the approved funding amount plus earnings to the one or more investors, wherein the first customer is one of the one or more investors;

apportioning, by the payment processing system, the portion of each transaction processed for the merchant by the payment processing system amongst the one or more investors; and transmitting, by the payment processing system, the apportioned amount to a respective account associated with each investor of the one or more investors.

2. The computer-implemented method of claim 1, wherein the merchant has an account with a payment processing service provider, who operates the payment processing system, to process the plurality of transactions between the merchant and the plurality of customers via the POS terminal.

3. The computer-implemented method of claim 1, wherein the register application further configures the POS terminal to present a user interface to enable the merchant to specify the one or more defined criteria, wherein the one or more defined criteria include at least one of: participation in one or more prior transactions with the merchant, or participation in prior crowdfunding projects established through the payment processing system, the method further comprising:

determining, by the payment processing system, based at least in part on accessing the data structure, a transaction history for the first customer, wherein the transaction history for the first customer is used, at least partially, to determine that the first customer is a potential investor.

4. A computer-implemented method comprising:

receiving, by a payment processing system, from a computing device configured by a register application as a POS terminal, transaction information for a plurality of transactions conducted between a merchant associated with the POS terminal and a plurality of customers;

generating, by the payment processing system, a data structure including attribute information of the plurality of customers of the merchant, wherein the attribute information is determined, at least partially, from aggregated transaction information received from the POS terminal;

calculating, by the payment processing system, crowdfunding terms based on a financial history of a merchant, the crowdfunding terms including an approved funding amount and repayment terms, the repayment terms including a portion of transactions processed for the merchant by the payment processing system to withhold for repayment of the approved funding amount plus earnings to one or more investors;

receiving, by the payment processing system, a request from the register application on the POS terminal to process a financial payment transaction conducted between the merchant and a first customer of the plurality of customers using the POS terminal;

accessing, by the payment processing system, the data structure to determine attributes of the first customer for determining that the first customer is a potential investor based on comparing the determined attributes of the first customer with one or more criteria for potential investors;

in response to determining, by the payment processing system, that the first customer is a potential investor, sending crowdfunding information to the POS terminal to cause the register application on the POS terminal to present on a display associated with the POS terminal an offer for enabling the first customer to invest in a crowdfunding project, the offer including crowdfunding terms;

receiving, by the payment processing system, an acceptance of the offer and an investment amount, wherein the register application configures the POS terminal to receive the acceptance and the investment amount from the first customer and transmit the acceptance and the investment amount to the payment processing system;

processing, by the payment processing system, payment card information from the first customer to fund the investment amount, wherein the register application configures the POS terminal to send the payment card information to the payment processing system, and the first customer is one of the one or more investors; and based on receiving from the one or more investors, a threshold amount for the crowdfunding project, sending, by the payment processing system, an instruction to transfer at least a portion of the approved funding amount to an account of the merchant.

5. The computer-implemented method of claim 4, further comprising:

receiving, by the payment processing system, via the POS terminal, a request from the merchant to establish the crowdfunding project, the request including an amount of funding being requested, wherein the POS terminal is configured by the register application to receive an input from the merchant indicating the one or more criteria for potential investors.

6. The computer-implemented method of claim 5, wherein the account of the merchant is an account with a payment processing service provider who operates the payment processing system to process the plurality of transactions between the merchant and the plurality of customers via the POS terminal.

7. The computer-implemented method of claim 4, further comprising:

receiving, via a payment instrument reader connected to the computing device configured as the POS terminal, payment instrument information from the investors to fund the approved funding amount, the register application configuring the POS terminal to enable a transfer of funds from the one or more investors to the merchant.

8. The computer-implemented method of claim 4, further comprising:
withholding, by the payment processing system, the portion of the transactions processed for the merchant by the payment processing system for repayment of the approved funding amount plus earnings to the one or more investors;
apportioning, by the payment processing system, the portion of the transactions processed for the merchant by the payment processing system amongst the one or more investors; and
transmitting, by the payment processor system, the apportioned amount to a respective account of each investor of the one or more investors, wherein the portion of the transactions processed for the merchant by the payment processing system includes a percentage of each transaction processed for the merchant by the payment processing system.

9. The computer-implemented method of claim 4, further comprising:
determining, by the payment processing system, a transaction history for the first customer, wherein the transaction history for the first customer is used to determine whether the first customer is a potential investor.

10. The computer-implemented method of claim 4, wherein the attributes of the first customer include a transaction frequency between the first customer and the merchant.

11. The computer-implemented method of claim 4, further comprising:
withholding, by the payment processing system, the portion of the transactions processed for the merchant by the payment processing system for repayment of the approved funding amount plus earnings to the one or more investors;
apportioning, by the payment processing system, the portion of the transactions processed for the merchant by the payment processing system amongst the one or more investors;
transmitting, by the payment processor system, the apportioned amount to a respective account of each investor of the one or more investors; and
tracking an investment amount for each investor of the one or more investors, wherein the apportioned amount reflects the investment amount of each investor of the one or more investors.

12. The computer-implemented method of claim 4, wherein the POS terminal is configured by the register application to receive an input from the merchant indicating a product or service for purchase by the first customer and receive payment instrument information from a payment instrument reader coupled with the POS terminal to enable a transfer of funds from the first customer to the account of the merchant.

13. The computer-implemented method of claim 4, wherein the payment processing system is configured to provide data to be presented in a graphical user interface on a display associated with the POS terminal, the graphical user interface showing one or more of the approved funding amount, repayment terms, a current funding amount, or an option to invest in the crowdfunding project.

14. The computer-implemented method of claim 4, wherein the crowdfunding terms are further based on a transaction history of the merchant and on anticipated transactions of the merchant after receiving the approved funding amount.

15. The computer-implemented method of claim 4, wherein the earnings are tied to one or more of a utilization of a particular asset, a lifespan of the particular asset, a time period, or a total earnings amount.

16. A point-of-sale (POS) terminal for processing a plurality of transactions between a plurality of customers and a merchant, the POS terminal comprising:
a payment instrument reader comprising an interface configured to receive payment information from payment instruments associated with individual ones of the customers;
a computing device coupled with the payment instrument reader, the computing device comprising:
a display;
one or more processors able to communicate with the display;
a memory storing instructions for a register application, which when executed by the one or more processors, cause the one or more processors to:
receive an input from the merchant indicating a purchase;
receive payment instrument information from the payment instrument reader for transferring funds from a respective customer to the merchant for the purchase;
send corresponding transaction information to a payment processing system, wherein the payment processing system maintains a data structure including attribute information of the plurality of customers aggregated from transaction information of the plurality of transactions conducted by the plurality of customers;
receive, from the payment processing system, crowdfunding terms calculated by the payment processing system based on a financial history of the merchant, the crowdfunding terms including an approved funding amount and repayment terms, the repayment terms including a portion of transactions processed by the payment processing system for the merchant to withhold for repayment of the approved funding amount plus earnings to the one or more investors;
transmit, to the payment processing system, a request to process a financial payment transaction conducted between the merchant and a first customer of the plurality of customers using the POS terminal, wherein the register application configures the request to include information identifying the first customer useable by the payment processing system for accessing the data structure including the attribute information of the plurality of customers;
receive an indication that the customer is a potential investor based on a comparison of attributes of the first customer with the one or more criteria for potential investors;
present, on the display, a first graphical interface including an offer to the first customer to invest in the crowdfunding project, the offer including crowdfunding terms;
receive, via the first graphical interface presented on the display, an input from the first customer indicating an acceptance of the offer and an investment amount; and
transmit, to the payment processing system, payment instrument information from the first customer to fund the investment amount.

17. The POS terminal of claim 16, wherein the instructions, when executed by the one or more processors, cause the one or more processors to:
  present, on the display, in the first graphical interface, a virtual control to enable the first customer to specify the investment amount.

18. The POS terminal of claim 16, wherein the instructions, when executed by the one or more processors, cause the one or more processors to:
  receive, from the payment instrument reader, the payment instrument information from the one or more investors to fund the approved funding amount; and
  transmit investment information including the payment instrument information and an investment amount, to the payment processing system.

19. The POS terminal of claim 16, wherein the portion of the transactions processed for the merchant by the payment processing system includes a percentage of each transaction processed for the merchant by the payment processing system.

20. The POS terminal of claim 16, wherein the instructions, when executed by the one or more processors, cause the one or more processors to:
  receive, via a second graphical interface presented on the display, a request from the merchant to create the crowdfunding project, the request including an amount of funding being requested and the one or more criteria for potential investors; and
  transmit, to the payment processing system, the request from the merchant to create the crowdfunding project and a request to calculate the crowdfunding terms for the crowdfunding project.

21. The POS terminal of claim 16, wherein the instructions, when executed by the one or more processors, cause the one or more processors to present, on the display, a second graphical interface showing one or more of the approved funding amount, repayment terms, or a current funding amount.

22. A computer-implemented method performed by a point-of-sale (POS) terminal comprising a payment instrument reader, a computing device coupled to the payment instrument reader, and a register application installed on the computing device that, when executed by the computing device configures the POS terminal to perform operations of the method comprising:
  receiving an input from a merchant indicating a purchase;
  receiving payment instrument information from the payment instrument reader for transferring funds from a respective customer to the merchant for the purchase;
  sending corresponding transaction information to a payment processing system, wherein the payment processing system maintains a data structure including attribute information of a plurality of customers aggregated from transaction information of a plurality of transactions conducted by the plurality of customers;
  receiving, from the payment processing system, crowdfunding terms calculated by the payment processing system based on a financial history of the merchant, the crowdfunding terms including an approved funding amount and repayment terms, the repayment terms including a portion of transactions processed for the merchant by the payment processing system to withhold for repayment of the approved funding amount plus earnings to one or more investors;
  transmitting, to the payment processing system, a request to process a financial payment transaction conducted between the merchant and a first customer of the plurality of customers using the POS terminal, wherein the register application configures the request to include information identifying the first customer useable by the payment processing system for accessing the data structure including the attribute information of the plurality of customers;
  receiving, an indication that the customer is a potential investor based on a comparison of attributes of the first customer with one or more criteria for potential investors;
  presenting, on a display associated with the computing device, a first graphical interface including an offer to the first customer to invest in the crowdfunding project, the offer including crowdfunding terms;
  receiving, via the first graphical interface presented on the display, an input from the first customer indicating an acceptance of the offer and an investment amount; and
  transmitting, to the payment processing system, payment instrument information from the first customer to fund the investment amount.

23. The computer-implemented method of claim 22, the operations further comprising:
  presenting, on the display, in the first the graphical interface, a virtual control to enable the first customer to specify the investment amount.

24. The computer-implemented method of claim 22, the operations further comprising:
  receiving, from the payment instrument reader, the payment instrument information from a payment instrument of the first customer to fund the investment amount; and
  transmitting the payment instrument information to the payment processing system, wherein the information identifying the first customer is determined at least partially from the payment instrument information.

25. The computer-implemented method of claim 22, wherein the portion of the transactions processed by the payment processing system for the merchant includes a percentage of each transaction processed for the merchant by the payment processing system.

26. The computer-implemented method of claim 22, the operations further comprising:
  receiving, via a second graphical interface presented on the display, a request from the merchant to create the crowdfunding project, the request including an amount of funding being requested and the one or more criteria for potential investors; and
  transmitting the request from the merchant to create the crowdfunding project and a request to calculate the crowdfunding terms for the crowdfunding project.

27. The computer-implemented method of claim 22, the operations further comprising:
  presenting, on the display, a second graphical interface showing one or more of the approved funding amount, repayment terms, or a current funding amount.

* * * * *